(12) United States Patent
Kim et al.

(10) Patent No.: US 12,087,096 B2
(45) Date of Patent: Sep. 10, 2024

(54) METHOD AND APPARATUS WITH BIOMETRIC SPOOFING CONSIDERATION

(71) Applicant: SAMSUNG ELECTRONICS CO., LTD., Suwon-si (KR)

(72) Inventors: Jiwhan Kim, Seongnam-si (KR); Kyuhong Kim, Seoul (KR); Sungun Park, Suwon-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 17/670,028

(22) Filed: Feb. 11, 2022

(65) Prior Publication Data

US 2022/0319238 A1 Oct. 6, 2022

(30) Foreign Application Priority Data

Mar. 31, 2021 (KR) ........................ 10-2021-0042091
May 28, 2021 (KR) ........................ 10-2021-0068812

(51) Int. Cl.
*G06V 40/40* (2022.01)
*G06V 10/82* (2022.01)
(Continued)

(52) U.S. Cl.
CPC .............. *G06V 40/40* (2022.01); *G06V 10/82* (2022.01); *G06V 40/1306* (2022.01);
(Continued)

(58) Field of Classification Search
CPC .............. G06V 40/40; G06V 40/1306; G06V 40/1318; G06V 40/16; G06V 40/18;
(Continued)

(56) References Cited

U.S. PATENT DOCUMENTS

2020/0319301 A1  10/2020  Qiu et al.
2022/0114424 A1*  4/2022  Quader ................ G06V 10/454

FOREIGN PATENT DOCUMENTS

JP        2021-22368 A      2/2021
KR   10-2018-0109619 A     10/2018
(Continued)

OTHER PUBLICATIONS

Yuan, Chengsheng, et al. "Deep residual network with adaptive learning framework for fingerprint liveness detection." IEEE Transactions on Cognitive and Developmental Systems 12.3 (2019): 461-473.

(Continued)

*Primary Examiner* — Edward F Urban
*Assistant Examiner* — Wassim Mahrouka
(74) *Attorney, Agent, or Firm* — NSIP Law

(57) ABSTRACT

A method and apparatus with spoofing consideration is provided. The method includes implementing convolution block(s) of a machine learning model that determines whether biometric information in an input image is spoofed, including generating a feature map including channels for an input feature map for the input image using convolution layers of a convolution block of the convolution block(s), in response to a total number of input channels of the convolution block and a total number of output channels of the convolution block being different, matching the total number of input channels of the convolution block and the total number of output channels of the convolution block by adding a zero-padding channel to the input feature map using a skip connection structure, and generating output data for determining whether the biometric information is spoofed, dependent on the generated feature map and a result of the skip connection structure.

53 Claims, 11 Drawing Sheets

(51) Int. Cl.
*G06V 40/13* (2022.01)
*G06V 40/16* (2022.01)
*G06V 40/18* (2022.01)

(52) U.S. Cl.
CPC .......... *G06V 40/1318* (2022.01); *G06V 40/16* (2022.01); *G06V 40/18* (2022.01)

(58) Field of Classification Search
CPC .... G06V 40/365; G06V 10/82; G06V 10/454; G06N 3/045; G06N 3/08
See application file for complete search history.

(56) References Cited

FOREIGN PATENT DOCUMENTS

| KR | 10-2062708 B1 | 2/2020 |
|---|---|---|
| KR | 10-2151427 B1 | 9/2020 |
| KR | 10-2020-0132665 A | 11/2020 |
| KR | 10-2184490 B1 | 11/2020 |
| KR | 10-2212125 B1 | 2/2021 |

OTHER PUBLICATIONS

Zhang, Yongliang, et al. "Slim-ResCNN: A deep residual convolutional neural network for fingerprint liveness detection." IEEE Access 7 (2019): 91476-91487.

Zhang, Yongliang, et al. "FLDNet: light dense CNN for fingerprint liveness detection." IEEE Access 8 (2020): 84141-84152.

Extended European Search Report issued on Aug. 5, 2022, in counterpart European Patent Application No. 22162552.8 (9 Pages in English).

Hu, et al. "Squeeze-and-excitation networks." *Proceedings of the IEEE conference on computer vision and pattern recognition*. 2018. pp. 7132-7141.

Muhammad, Usman, and Abdenour Hadid. "Face anti-spoofing using hybrid residual learning framework." *2019 International Conference on Biometrics (ICB)*. IEEE, Jun. 4-7, 2019. pp. 1-7.

Han, et al. "Deep pyramidal residual networks." *Proceedings of the IEEE conference on computer vision and pattern recognition*. 2017. pp. 5927-5935.

Sandler, et al. "Mobilenetv2: Inverted residuals and linear bottlenecks." *Proceedings of the IEEE conference on computer vision and pattern recognition*. 2018. pp. 4510-4520.

Howard, et al. "Searching for mobilenetv3." *Proceedings of the IEEE/CVF International Conference on Computer Vision*. 2019. pp. 1314-1324.

Cal, et al. "Proxylessnas: Direct neural architecture search on target task and hardware." *arXiv preprint arXiv:1812.00332*; Feb. 23, 2019. pp. 1-13.

Woo, Sanghyun, et al. "Cbam: Convolutional block attention module." *Proceedings of the European conference on computer vision (ECCV)*. 2018. pp. 1-17.

* cited by examiner

METHOD AND APPARATUS WITH BIOMETRIC SPOOFING CONSIDERATION

CROSS-REFERENCE TO RELATED APPLICATIONS

This application claims the benefit under 35 USC § 119(a) of Korean Patent Application No. 10-2021-0042091 filed on Mar. 31, 2021, and Korean Patent Application No. 10-2021-0068812 filed on May 28, 2021, in the Korean Intellectual Property Office, the entire disclosures of which are incorporated herein by reference for all purposes.

BACKGROUND

1. Field

The following description relates to a method and apparatus with biometric spoofing consideration.

2. Description of Related Art

Typically, user authentication or verification may be performed by obtaining a fingerprint image of a user using a sensor and comparing the obtained fingerprint image to a pre-enrolled fingerprint image. Here, if a finely fabricated fake fingerprint pattern is input to the sensor, a typical fingerprint recognizing device may not distinguish the fake fingerprint pattern from a genuine fingerprint pattern and thus, may typically falsely recognize the fake fingerprint pattern as a biological fingerprint or authenticated fingerprint. For example, if a material such as rubber, silicone, gelatin, epoxy, or latex on which a fingerprint is engraved comes into contact with the sensor, the fingerprint engraved on such a material may typically be recognized as a human live fingerprint.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes implementing one or more of a plurality of convolution blocks of a machine learning model that determines whether biometric information in at least an input image is spoofed, including generating a feature map including a plurality of channels for an input feature map for the input image using one or more convolution layers of a convolution block of the one or more convolution blocks, in response to a total number of input channels of the convolution block and a total number of output channels of the convolution block being different, matching the total number of input channels of the convolution block and the total number of output channels of the convolution block by adding a zero-padding channel to the input feature map using a skip connection structure of the convolution block, and generating output data, for determining whether the biometric information is spoofed, dependent on the generated feature map and a result of the skip connection structure of the convolution block.

The method may further include determining whether biometric information in the input image is spoofed dependent on the generated output data.

The one or more convolution blocks may include at least two convolution blocks, and the method may further include generating an additional feature map including another plurality of channels for the generated output data of the convolution block, as a corresponding other feature map, using one or more convolution layers of another convolution block of the two or more convolution blocks, in response to a total number of input channels of the other convolution block and a total number of output channels of the other convolution block being different, matching the total number of input channels of the other convolution block and the total number of output channels of the other convolution block by adding a zero-padding channel to the corresponding other feature map using a skip connection structure of the other convolution block, and generating a determination of whether the biometric information is spoofed dependent on the generated additional feature map and a result of the skip connection structure of the other convolution block.

The convolution block and the other convolution block may have different convolution parameters, and the different convolution parameters may include any one or any combination of different respective convolution layer channel multiplication sizes between the convolution block and the other convolution block, different respective convolution kernel sizes of at least one respective convolution layer between the convolution block and the other convolution block, and different respective total numbers of channels of respectively generated feature maps of the convolution block and the other convolution block.

One or both of the generating of the feature map and the generating of the additional feature map may include an attention mechanism.

The machine learning model may be a neural network.

The neural network may include at least the convolution block and at least the other convolution block.

The plurality of convolution blocks may include another one or more convolution blocks, and the method may further include generating an additional feature map including another plurality of channels for a corresponding input feature map for another input image using one or more convolution layers of another convolution block of the one or more convolution blocks, in response to a total number of input channels of the other convolution block and a total number of output channels of the other convolution block being different, matching the total number of input channels of the other convolution block and the total number of output channels of the other convolution block by adding a zero-padding channel to the corresponding input feature map using a skip connection structure of the other convolution bloc, and generating another output data, for determining whether biometric information of the other input image is spoofed, dependent on the generated additional feature map and a result of the skip connection structure of the other convolution block.

The generating of the feature map and the additional feature map may be performed in parallel.

The method may further include generating a combined determination of whether the biometric information is spoofed dependent on the generated output data and dependent on the generated other output data.

One or both of the generating of the feature map and the generating of the additional feature map may include an attention mechanism.

The machine learning model may include a neural network that includes at least the convolution block, and another neural network that may include at least the other convolution block, or the machine learning model may be a neural network that includes at least the convolution block and at least the other convolution block.

The method may further include obtaining the input image, the input image including biometric information of a user, inputting the input image to the machine learning model, and determining whether the input image includes spoofed biometric information dependent at least on the generated determination.

The matching of the total number of input channels and the total number of output channels may include, in response to the total number of input channels and the total number of output channels being different, concatenating the zero-padding channel corresponding to a determined insufficient number of channels in the input feature map of the convolution block to the input feature map.

The matching of the total number of input channels and the total number of output channels may be selectively performed, where the matching may not be performed in response to the total number of input channels and the total number of output channels being same, and where performance of the skip connection structure when the matching is not performed may include outputting the input feature map, without the zero-padding channel, by an identity skip connection as the result of the skip connection structure of the convolution block.

In response to a non-channel size of an input feature map of the convolution block and a non-channel size of an output feature map of the convolution block being different, matching the non-channel size of the input feature map and the non-channel size of the output feature map using a pooling layer included in the skip connection structure for generating the result of the skip connection structure of the convolution block.

The method may further include, in response to the non-channel size of the input feature map and the non-channel size of the output feature map being same, implementing the skip connection structure without implementation of the pooling layer.

The one or more convolution blocks may include at least two convolution blocks that have different convolution parameters, and the different convolution parameters may include any one or any combination of different respective convolution layer channel multiplication sizes between the at least two convolution blocks, different respective convolution kernel sizes of at least one respective convolution layer between the at least two convolution blocks, and different respective total numbers of channels of respectively generated feature maps of the at least two convolution blocks.

With respect to the generating of the feature map, the convolution block may include a first convolution layer with a size of 1×1 configured to generate a first feature map dependent on the input feature map, where the first feature map may have a same size as a size of the input feature map and a different total number of channels from a total number of channels of the input feature map, a second convolution layer with a size of k×k configured to generate a second feature map dependent on the first feature map, where the second feature map may have a same total number of channels as the total number of channels of the first feature map and a size obtained by changing the size of the first feature map, where k is a natural number greater than zero, and a third convolution layer with a size of 1×1 configured to generate a third feature map dependent on the second feature map, where the third feature map may have a same size as the size of the second feature map and a same total number of channels as, or a different total number of channels from, the total number of channels of the second feature map.

The second convolution layer may include one of a depth-wise separable convolution layer and a group-wise convolution layer.

The convolution block may further include at least one of one or more normalization layers configured to respectively normalize the generated first feature map, the generated second feature map, and/or the generated third feature map, and one or more nonlinear activation functions respectively provided the normalized first feature map, the normalized second feature map, and/or the normalized third feature map.

The second convolution layer may be configured to generate the second feature map based on a result of a first nonlinear activation function of the one or more nonlinear activation functions that is provided the normalized first feature map, the third convolution layer may be configured to generate the third feature map based on a result of a second nonlinear activation function of the one or more nonlinear activation functions that is provided the normalized second feature map, and/or the generating of the output data may be based on a result of a third nonlinear activation function of the one or more nonlinear activation functions that is provided the normalized third feature map.

The method may further include implementing an attention mechanism, including assigning respective weights for channels of a corresponding feature map, generated dependent on the one or more convolution layers, using an attention layer included in the convolution block, where the assigning of the respective weights for the channels of the corresponding feature map may include assigning, according to determined importances of each channel of the corresponding feature map, respective weights for each channel of the corresponding feature map using the attention layer.

The method may further include implementing an attention mechanism, including assigning respective weights for channels of the feature map using an attention layer included in the convolution block, where the generating of the output data may include generating the output data for determining whether the biometric information is spoofed dependent on a result of the assigning of the respective weights for the channels of the feature map and dependent on a result of the skip connection structure that includes the added zero-padding channel.

The one or more convolution layers of the convolution block may include at least three convolution layers, the attention layer may be disposed after a third convolution layer among the at least three convolution layers, and the assigning of the respective weights may include assigning respective weights for each channel of a feature map resulting from the third convolution layer.

The one or more convolution layers of the convolution block may include at least three convolution layers, the attention layer may be disposed between a second convolution layer and a third convolution layer among the at least three convolution layers, and the assigning of the respective weights may include assigning respective weights for each channel of a feature map resulting from the second convolution layer and prior to the third convolution layer.

The attention layer may include a global pooling layer configured to resize a corresponding feature map, generated by one of the one or more convolution layers, to a size of 1×1, a first fully connected layer configured to convert the resized corresponding feature map into a single vector by smoothing the resized corresponding feature map. a second fully connected layer configured to smooth an output of the first fully connected layer, and a nonlinear activation function configured to change a form of an output of the second fully connected layer.

The nonlinear activation function may include one of a hard sigmoid function, a softmax function, and a hyperbolic tangent (tanh) function.

The method may further include respectively inputting a plurality of images, including the input image, to a plurality of neural networks each configured to generate data for determining whether biometric information in a corresponding input image of the input plurality of images is spoofed, where each of the plurality of neural networks may include one or more corresponding convolution blocks with at least one of the plurality of neural networks being input the input image and may include the convolution block, and determining whether a biometric information for any of the plurality of images is spoofed dependent on a plurality of each of on the generated data.

The determining of whether the biometric information for any of the plurality of images is spoofed may include an element-wise summation of each of the generated data.

The method may further include obtaining the input image using any one or any combination of an ultrasonic fingerprint sensor, an electrostatic fingerprint sensor, an optical fingerprint sensor, an iris sensor, a depth sensor, and an image sensor.

The biometric information may include one of a fingerprint, an iris, and a face of the user.

In one general aspect, one or more embodiments include a non-transitory computer-readable storage medium storing instructions that, when executed by a processor, cause the processor to perform any one or any combination of any two or more or all operations and/or methods described herein.

In one general aspect, an apparatus includes a sensor configured to capture an input image, a memory configured to store a neural network, including one or more convolution blocks, for a determination of whether biometric information of a user in the input image is spoofed, and a processor configured generate a feature map including a plurality of channels for an input feature map for the input image using one or more convolution layers of a convolution block of the one or more convolution blocks, in response to a total number of input channels of the convolution block and a total number of output channels of the convolution block being different, match the total number of input channels of the convolution block and the total number of output channels of the convolution block by an addition of a zero-padding channel to the input feature map using a skip connection structure of the convolution block, and generate output data, for the determination of whether the biometric information is spoofed, dependent on the generated feature map and a result of the skip connection structure of the convolution block.

The processor may be further configured to perform the determination of whether the biometric information is spoofed based on the generated output data, and perform user authentication of the input image, where a result of the performed user authentication is dependent on a result of the performed determination.

The processor may be configured to, in response to the total number of input channels and the total number of output channels being different and for the addition of the zero-padding channel to the input feature map, concatenate the zero-padding channel corresponding to a determined insufficient number of channels in the input feature map of the corresponding convolution block to the input feature map.

The processor may be configured to, in response to the total number of input channels and the total number of output channels being same, output the input feature map, without the zero-padding channel, by an identity skip connection as the result of the skip connection structure of the convolution block.

The processor may be configured to, in response to a non-channel size of an input feature map of the convolution block and a non-channel size of an output feature map of the convolution block being different, match the non-channel size of the input feature map and the non-channel size of the output feature map using a pooling layer included in the skip connection structure for generating the result of the skip connection structure of the convolution block.

The processor may be configured to, in response to the non-channel size of the input feature map and the non-channel size of the output feature map being same, implement the skip connection structure without implementation of the pooling layer.

The one or more convolution blocks may include at least two convolution blocks that have different convolution parameters, and the different convolution parameters may include any one or any combination of different respective convolution layer channel multiplication sizes between the at least two convolution blocks, different respective convolution kernel sizes of at least one respective convolution layer between the at least two convolution blocks, and different respective total numbers of channels of respectively generated feature maps of the at least two convolution blocks.

With respect to the generating of the feature map, the convolution block may include a first convolution layer with a size of 1×1 configured to generate a first feature map dependent on the input feature map, where first feature map may have a same size as a size of the input feature map and a different total number of channels from a total number of channels of the input feature map, a second convolution layer with a size of k×k configured to generate a second feature map dependent on the first feature map, where the second feature map may have a same total number of channels as the total number of channels of the first feature map and a size obtained by changing the size of the first feature map, where k is a natural number greater than zero, and a third convolution layer with a size of 1×1 configured to generate a third feature map dependent on the second feature map, where the third feature map may have a same size as the size of the second feature map and a same total number of channels, as or a different number total of channels from, the total number of channels of the second feature map.

The second convolution layer may include one of a depth-wise separable convolution layer and a group-wise convolution layer.

The convolution block may further include at least one of one or more normalization layers configured to respectively normalize the generated first feature map, the generated second feature map, and/or the generated third feature map, and one or more nonlinear activation functions respectively provided the normalized first feature map, the normalized second feature map, and/or the normalized third feature map.

The second convolution layer may be configured to generate the second feature map based on a result of a first nonlinear activation function of the one or more nonlinear activation functions that is provided the normalized first feature map, the third convolution layer may be configured to generate the third feature map based on a result of a second nonlinear activation function of the one or more nonlinear activation functions that is provided the normalized second feature map, and/or the generation of the output data may be based on a result of a third nonlinear activation function of the one or more nonlinear activation functions that is provided the normalized third feature map.

The processor may be further configured to implement an attention mechanism, where the attention mechanism may include an assignment of respective weights for channels of a corresponding feature map, generated dependent on the one or more convolution layers, using an attention layer included in the convolution block, where the assignment of the respective weights for the channels of the corresponding feature map may include an assignment, according to determined importances of each channel of the corresponding feature map, of respective weights for each channel of the corresponding feature map using the attention layer.

The processor may be further configured to implement an attention mechanism, where the attention mechanism may include an assignment of respective weights for channels of the feature map using an attention layer included in the convolution block, and where, for the generation of the output data, the processor may be configured to generate the output data for the determination of whether the biometric information is spoofed dependent on a result of the assigning of the respective weights for the channels of the feature map and dependent on a result of the skip connection structure that includes the added zero-padding channel.

The one or more convolution layers of the convolution block may include at least three convolution layers, the attention layer may be disposed after a third convolution layer among the at least three convolution layers, and, for the assignment of the respective weights, the processor may be configured to assign respective weights for each channel of a feature map resulting from the third convolution layer.

The one or more convolution layers of the convolution block may include at least three convolution layers, the attention layer may be disposed between a second convolution layer and a third convolution layer among the at least three convolution layers, and, for the assignment of the respective weights, the processor may be configured to assign respective weights for each channel of a feature map resulting from the second convolution layer and prior to the third convolution layer.

The attention layer may include a global pooling layer configured to resize a corresponding feature map, generated by one of the one or more convolution layers, to a size of 1×1, a first fully connected layer configured to convert the resized corresponding feature map into a single vector by smoothing the resized corresponding feature map, a second fully connected layer configured to smooth an output of the first fully connected layer, and a nonlinear activation function configured to change a form of an output of the second fully connected layer.

The nonlinear activation function may include one of a hard sigmoid function, a softmax function, and a hyperbolic tangent (tanh) function.

The processor may be further configured to respectively input a plurality of images, including the input image, to a plurality of neural networks each configured to generate data for determining whether biometric information in a corresponding input image of the input plurality of images is spoofed, where each of the plurality of neural networks may include one or more corresponding convolution blocks with at least one of the plurality of neural networks being input the input image and includes the convolution block, and determine whether a biometric information for any of the plurality of images is spoofed dependent on a plurality of each of on the generated data.

The determination of whether the biometric information for any of the plurality of images is spoofed may include an element-wise summation of each of the generated data.

The sensor may include any one or any combination of an ultrasonic fingerprint sensor, an electrostatic fingerprint sensor, an optical fingerprint sensor, an iris sensor, a depth sensor, and an image sensor.

The biometric information may include one of a fingerprint, an iris, and a face of the user.

Other features and aspects will be apparent from the following detailed description, the drawings, and the claims.

Figure 1:
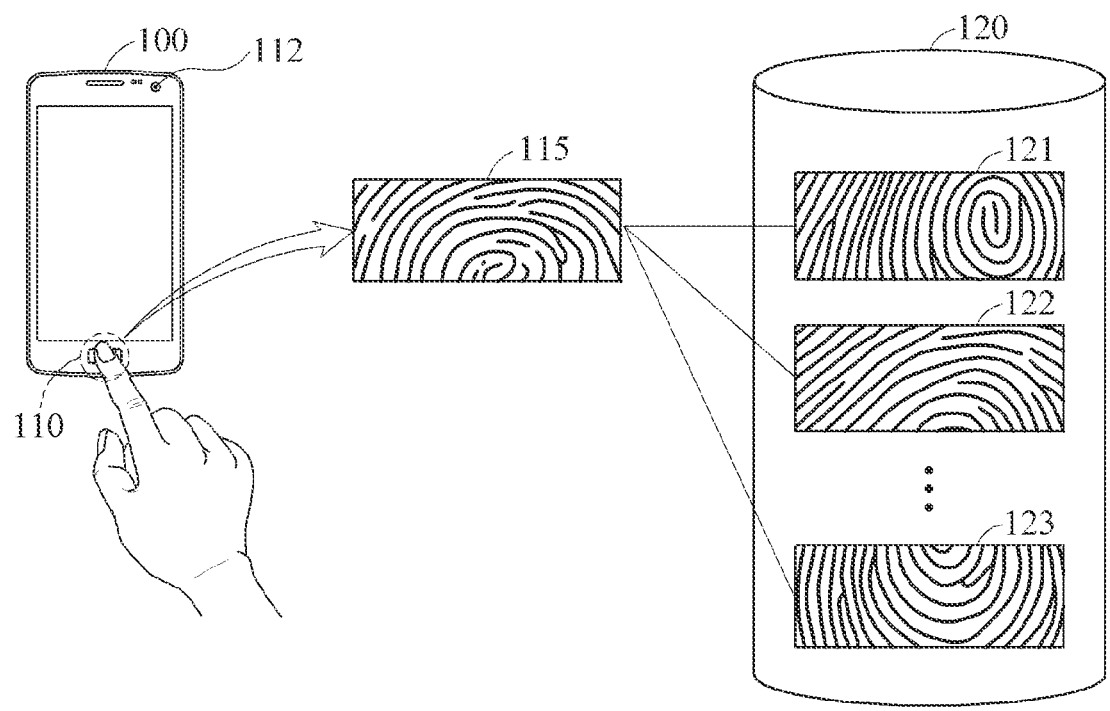
FIG. 1 illustrates an example electronic apparatus configured to perform biometric fingerprint authentication with spoofing avoidance, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

FIG. 1 illustrates an example electronic apparatus configured to perform biometric fingerprint authentication with spoofing avoidance, according to one or more embodiments. FIG. 1 illustrates an electronic apparatus 100 configured to perform biometric fingerprint authentication that may detect whether biometric information is spoofed or perform the fingerprint authentication with biometric spoofing avoidance, and an enrolled fingerprint database (DB) 120 that includes enrolled fingerprint images 121, 122, and 123. The electronic apparatus 100 may include one or more sensors 110 configured to sense biometric information (for example, fingerprint(s)) of a user. An example in which biometric information of a user is a fingerprint will be described below for convenience of description, however, examples are not limited thereto. For example, the biometric information may include a variety of information, for example, an iris, lines of a palm, and/or a face, e.g., alternatively or in addition to the fingerprint captured by the example sensor 110, captured by the camera 112 illustrated in the electronic apparatus 100 of FIG. 1. For example, the camera 112 is representative of one or more cameras and/or optical sensors configured to captured images of an iris, lines of a palm, and/or a face, as non-limiting examples. While the sensor 110 is illustrated as capturing one or more fingerprints, the one or more fingerprints may also be captured by such a camera or sensor represented by the camera 112. While the below discussions with respect to the biometric information will be made with the biometric information being a fingerprint, the below discussions regarding the spoof detection, or otherwise authentication with spoofing avoidance, should also be understood to be discussions where the input image may additionally or alternatively be the iris, lines of the palm, and/or the face, as non-limiting examples.

As a non-limiting example, the electronic apparatus 100 is a smartphone or any of various other electronic apparatuses or devices.

Accordingly, electronic apparatus 100 may obtain the example input fingerprint image 115 representing a fingerprint of a user, using the sensor 110. The sensor 110 may be, for example, an ultrasonic fingerprint sensor, an optical fingerprint sensor, an electrostatic fingerprint sensor, and/or an image sensor, which may capture a fingerprint of a user, but is not limited thereto.

Fingerprint enrollment for fingerprint recognition may be or have been performed. The enrolled fingerprint images 121, 122, and 123 may be stored in advance in the enrolled fingerprint DB 120 by a fingerprint enrollment process, e.g., in advance of an authentication operation of a captured fingerprint. For personal information protection, the enrolled fingerprint DB 120 may store features extracted from the enrolled fingerprint images 121, 122, and 123, instead of storing the enrolled fingerprint images 121, 122, and 123. The enrolled fingerprint DB 120 may be stored in a memory of the electronic apparatus 100, or in an external device such as another electronic apparatus, a server, or a connected local cache, as non-limiting examples, that may communicate with the electronic apparatus 100.

When the input fingerprint image 115 for authentication is received, the electronic apparatus 100 may recognize a fingerprint of a user by comparing a fingerprint (hereinafter, referred to as an "input fingerprint") included in the input fingerprint image 115 and enrolled fingerprints included in the enrolled fingerprint images 121, 122, and 123. The electronic apparatus 100 may compare one or more extracted features of the input fingerprint and respective one or more features of each of the enrolled fingerprints.

Biometric authentication may include a matching process of verifying whether a user attempting authentication has the authority to access the electronic apparatus 100 or operations of the electronic apparatus 100, or to access a secure place, and an anti-spoofing (ASP) process of determining whether biometric information is forged/spoofed or merely determining that authentication fails when characteristics of such forging/spoofing exist. In the ASP process, since a false authentication is attempted by mimicking, falsifying, or duplicating biometric information of a user, it is typically difficult to increase an accuracy and/or a speed of spoofing detection.

For example, when the input fingerprint image 115 is obtained by sensing a fake fingerprint and when a fingerprint pattern of the input fingerprint image 115 is similar to a fingerprint pattern of one of the enrolled fingerprint images 121, 122, and 123, a preliminary authentication evaluation of the fake fingerprint may be likely to succeed. The electronic apparatus 100 may prevent spoofing by determining whether the input fingerprint in the input fingerprint image 115 is a fake fingerprint or a real fingerprint of a person. The term "spoofing" used herein may indicate using fake biometric information, instead of live biometric information, and may be construed to encompass, for example, use of duplicated, forged, synthesized, or falsified biometric information.

For example, if a deviation between a real fingerprint image and a fake fingerprint image is extremely small, typically it may not be easy to detect whether biometric information is spoofed using a small-sized or compact machine learning model, e.g., a neural network with a limited number of computations or layer connections, due to a similarity between images. If a typical large-sized neural network is used, a computation time to detect whether spoofing occurs may increase even though performance of detecting whether spoofing occurs may be enhanced, thereby resulting in a considerable amount of time to be used in an authentication process, which may cause inconvenience to users. Examples are explained below with respect to one or more neural network machine learning models, while noting that examples are not limited thereto.

In an example, convolution operations that typically have the greatest influence or impact on computational complexity may be reduced or minimized through use of a skip connection structure, or through use of a skip connection structure and an attention block included in a convolution block of the corresponding neural network, and thus it may be possible to enhance the performance of determining or detecting (hereinafter collectively referred to as 'detecting') whether spoofing occurs, instead of significantly increasing the computational complexity as typically needed for spoofing prevention, even though a small-sized neural network may be used. Examples of the attention block and the skip connection structure will be further described below. Additionally, while an example of the attention block and various arrangements of the attention block with respect to one or more convolution layers in the example convolution block may be described as example attention mechanisms of the convolution block, these are non-limiting examples of such attention mechanisms.

Figure 2:
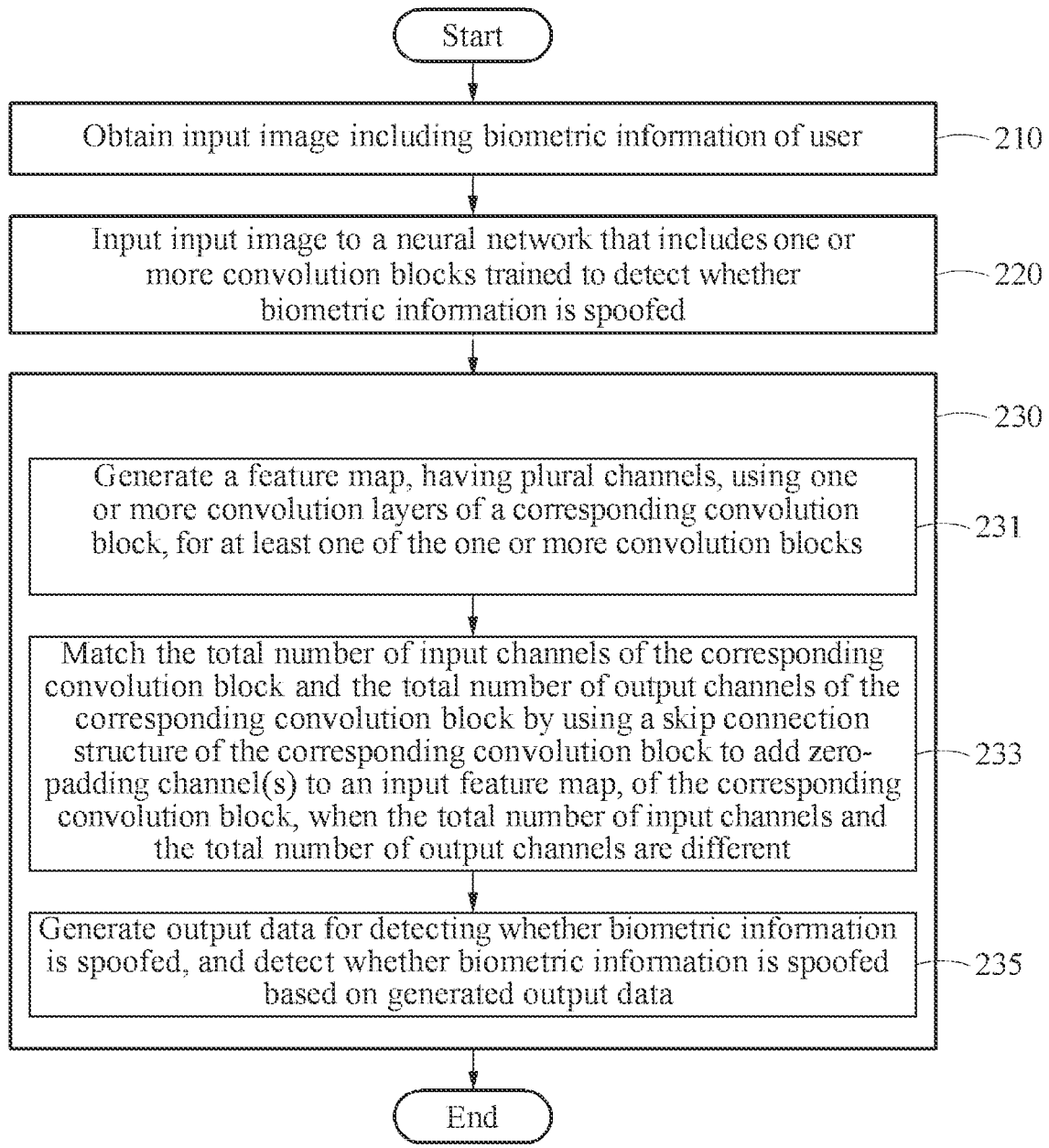
FIG. 2 illustrates an example method of determining whether biometric information is spoofed, according to one or more embodiments.

FIG. 2 illustrates an example method of detecting whether biometric information is spoofed, according to one or more embodiments. In the following example, operations may be sequentially performed, but are not necessarily performed in the illustrated sequence. For example, examples exist where the order of operations may be changed, examples exist where at least two operations may be performed in parallel, and examples exist with the illustrated or various other sequence orders, with or without such one or more parallel operations.

FIG. 2 illustrates a process in which an electronic apparatus generates data for determining whether biometric information is spoofed through operations 210 to 235, for example. As a non-limiting example, these following spoofing detection processes may be performed after, as a non-limiting example, an example authentication matching process of the electronic apparatus of verifying whether an input image with biometric information, for a user in an attempted user authentication in an example biometric authentication process of the electronic apparatus, meets an authentication matching threshold, a positive result of which may thereby preliminarily indicate that the user is authenticated. When spoofing is then not detected with respect to the biometric information, for example, the positive result of this authentication process and a determination that spoofing is not detected may represent a final determination that the imaged user has an authority to access a system of the electronic apparatus, for example, that is, is an enrolled user, however, noting that examples are not limited to such permission, action, or non-action dependent on positive or negative results of such authentication and spoofing detection. If the spoofing detection determines that the input image is spoofed, then such authentication matching operation may not need to be performed and the user may not be authenticated. Rather, where these following spoofing detection processes are performed before, as another non-limiting example, the authentication matching process, when the result of the spoofing detection being that the input image of the user is not spoofed then the example authentication (e.g., including the example authentication matching) of the input image may be selected to be performed, with a positive result of the example authentication matching then being that the user is finally authenticated and the user may have the authority to access the system of the electronic apparatus, for example, as discussed above. If the result of the detection of the whether the biometric information is spoofed is that the input image of the user is spoofed then the input image will be considered to be a spoofed image of the user and the person, for example, attempting the spoofing will not be authenticated, e.g., such authentication matching operations may not need to be performed. Likewise, if the example authentication matching result is negative, regardless of the spoofing detection result, the user may not be authenticated. The spoofing detection and the authentication matching may be performed in parallel as well.

Accordingly, in operation 210, the electronic apparatus may obtain (capture) or otherwise be provided an input image including biometric information of a user. The electronic apparatus may obtain the input image using, for example, any one or any combination of an ultrasonic fingerprint sensor, an electrostatic fingerprint sensor, an optical fingerprint sensor, an iris sensor, a depth sensor, a vision sensor, and an image sensor. As a sensor, any one or two or more of the above sensors may also be used. Biometric information sensed by a sensor may be, for example, the input fingerprint image 115 of FIG. 1, an iris image, a palm image, or a face image.

In operation 220, the electronic apparatus may input the input image obtained in operation 210 to a machine learning model, e.g., a neural network, that includes one or more convolution blocks trained to detect whether biometric information is spoofed. For example, the neural network may be trained to determine whether an input fingerprint is a fake fingerprint, as a non-limiting example, based on a plurality of unspecified real fingerprint features provided in advance, a plurality of unspecified fake fingerprint features provided in advance, and/or enrolled fingerprint features of a device user. For example, during an example training of the neural network, an objective function may be a loss function that can be used for calculating a loss for an input training data to the in-training neural network, where the calculated loss may be between an expected value to be output based on the input training data and the actual output value resulting from the inputting of the training data to the in-training neural network. The electronic apparatus may iteratively update connection weights of the neural network using additional input training data to reduce values of the loss function over time, e.g., to a threshold minimum value or level.

Figure 3:
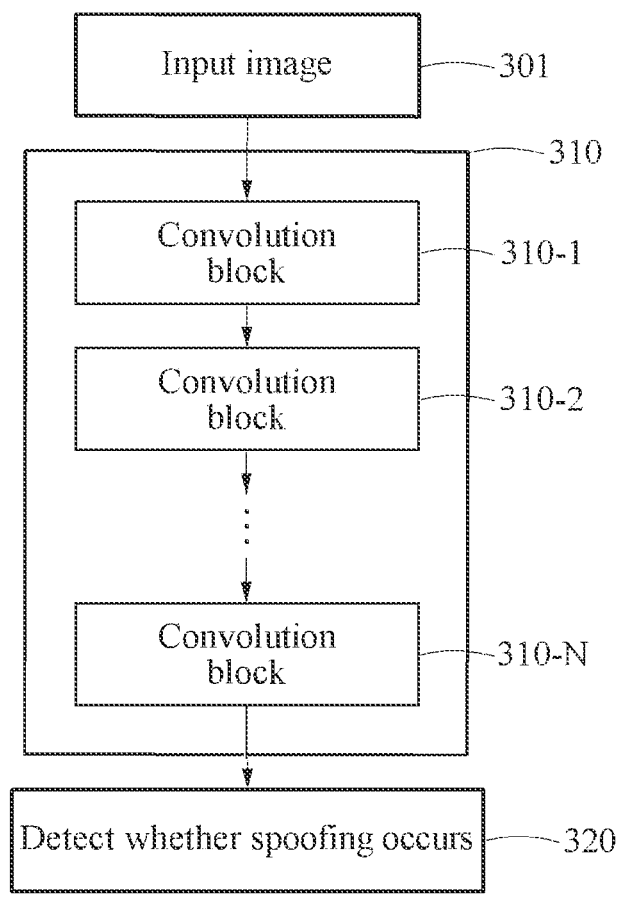
FIG. 3 illustrates an example structure of a neural network, according to one or more embodiments.
Figure 10:
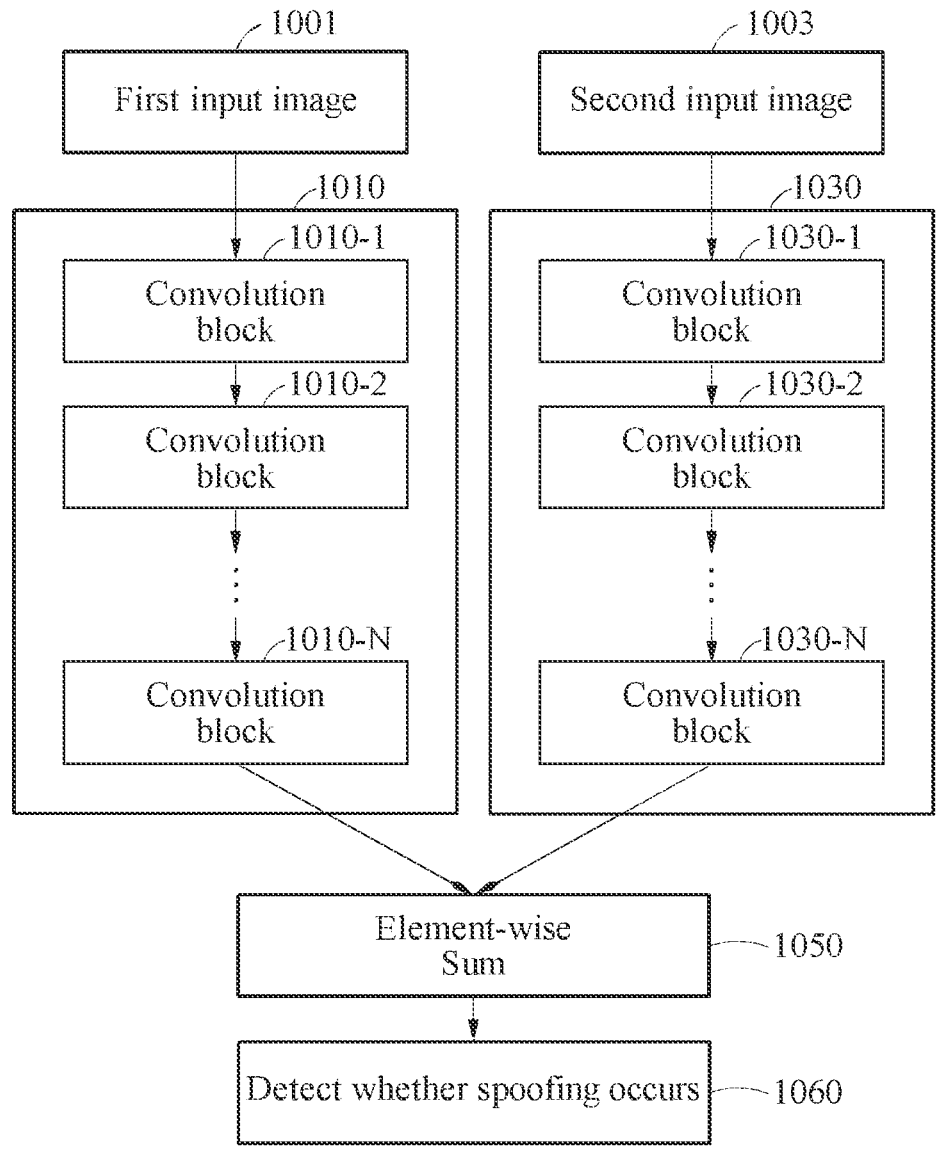
FIG. 10 illustrates an example structure of a neural network, according to one or more embodiments.

References to the neural network may be considered references to the training of the neural network for a single training image or for a plurality of training images, or references to the neural network may be considered references to the resultant trained neural network that is provided a single input image or a plurality of input images during an inference operation. In an example, if a single input image is provided, one neural network 310 corresponding to one input image 301 may be used as shown in FIG. 3, as a non-limiting example. In an example, if a plurality of input images are provided, a plurality of neural networks 1010 and 1030 corresponding to a plurality of images 1001 and 1003 may be used as shown in FIG. 10, as a non-limiting example. Thus, an example structure of a neural network for detecting whether biometric information is spoofed from a single input image will be further described below with reference to FIG. 3, according to one or more embodiments. In addition, an example structure of a neural network for detecting whether biometric information is spoofed from a plurality of images (for example, two images) will be further described below with reference to FIG. 10, according to one or more embodiments. The neural network may be, for example, a convolutional neural network (CNN), or a deep neural network (DNN), but is not limited thereto.

The neural network may include one or more convolution blocks that are trained (or have been trained) to generate or extract a feature vector or a feature map suitable for detecting or indicating whether biometric information is spoofed. For example, a convolution block may convert an input image into a feature map. The one or more convolution blocks may be trained (or have been trained) based on a plurality of pieces of unspecified live biometric information and a plurality of pieces of unspecified fake biometric information. During training, the electronic apparatus may use an objective function, such as the aforementioned loss function, to measure how close currently set connection weights in the neural network are to an optimal loss value or a certain loss threshold, may continue to change the connection weights based on a result of the objective function, and may repeatedly perform the training until a predetermined condition is met, e.g., a predetermined accuracy.

Each of the convolution blocks may have different parameters, such as to evaluate different aspects of features of the input image, as a non-limiting example. As non-limiting examples, the parameters may include, for example, any one or any combination of a channel multiplication size n of respective convolution layers included in each of the convolution blocks, a kernel size k of the respective convolution layers, and a total number of channels of a feature map, e.g., a feature map provided to a corresponding convolution block, a feature map generated by or resulting from the corresponding convolution block, and/or a feature map provided to or toward (or output by or resulting from) one or more of respective convolution layers of the corresponding convolution block. Non-limiting examples of various configurations of convolution blocks will be further described below.

In or based on operation 230, the electronic apparatus may detect whether the biometric information is spoofed, based on output data output from the convolution blocks. The electronic apparatus may detect whether the biometric information is spoofed by performing or based on operations 231 to 235, for one or more (e.g., or all) of the convolution blocks.

In operation 231, the electronic apparatus may generate a feature map including a plurality of channels using one or more convolution layers included in a corresponding convolution block among the convolution blocks, e.g., based on an input image or feature map of the electronic apparatus for which spoof detection is to be performed, or based on a feature map generated by another one or more of the convolution blocks and provided or available to the corresponding convolution block.

In operation 233, the electronic apparatus may match a total number of input channels of the corresponding convolution block and a total number of output channels of the corresponding convolution block by adding a zero-padding channel, which will be described in greater detail below, to a feature map input to the corresponding convolution block using a skip connection structure included in the corresponding convolution block, when the total number of input channels and the total number of output channels are different. An example skip connection structure will be described in greater detail further below with reference to a skip connection structure 405 of FIG. 4, according to one or more embodiments. Such a matching with the performed zero-padding and skip connection may likewise be performed for each of the one or more of the convolution blocks.

Figure 4:
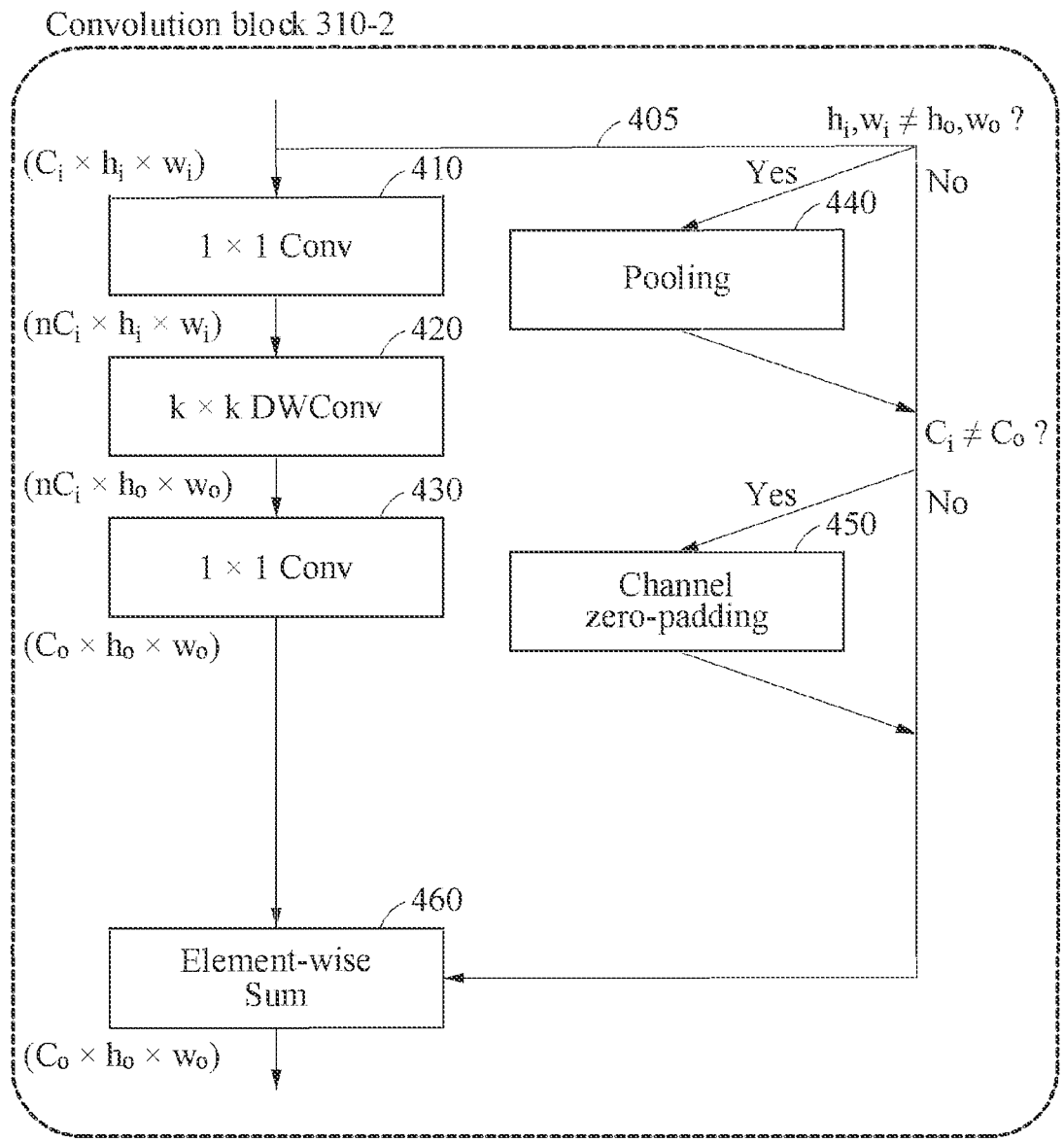
FIGS. 4 to 7 illustrate example structures of convolution blocks, according to one or more embodiments.

As another example of operation 233, when a size (height h×width w) of the feature map input to the corresponding convolution block is different from a size of a feature map output by the corresponding convolution block, the electronic apparatus may match the size of the input feature map and the size of the output feature map using, for example, a pooling layer 440 included in the skip connection structure 405 shown in FIG. 4, according to one or more embodiments. In an example, when the size of the input feature map and the size of the output feature map are the same, the skip connection structure 405 may output a feature map without using the pooling layer 440 or without otherwise performance of size matching with respect to the input feature map.

As a further example of operation 233, when both such feature map size matching and such channel number matching are not performed by the skip connection structure 405, the skip connection structure 405 may output the input feature map without change. Further, when both such feature map size matching and such channel number matching are performed by the skip connection structure 405, the skip connection structure 405 may output a feature map based on both the feature map size matching and the channel number matching being performed with respect to the input feature map, for example.

As an example of the channel number matching, based on whether the total number of input channels and the total number of output channels are different or the same, the skip connection structure 405 may or may not concatenate the example zero-padding channel to the input feature map, respectively. For example, skip connection structure 405 may concatenate the zero-padding channel to the input feature map (or the result of the pooling layer 440) when the total number of input channels and the total number of output channels are different. The zero-padding channel may be generated using a zero-padding block 450 included in the skip connection structure 405 and may be filled with zeros, as a non-limiting example.

In operation 235, the electronic apparatus may generate output data for detecting whether the biometric information is spoofed, based on the feature map generated in operation 231 and the feature map generated in operation 233 by the skip connection structure 405. Similar to above, when there are plural convolution blocks (e.g., two or more or all convolution blocks) that implement respective skip connections, operation 235 may be respectively performed for each of the plural convolution blocks.

As a non-limiting example, the electronic apparatus may generate output data as the output of a last convolution block among the convolution blocks as an output data result of the detecting of whether the biometric information is spoofed.

FIG. 3 illustrates an example of a structure of a neural network, as the example machine learning model. FIG. 3 illustrates a structure of a neural network 310 configured to receive an input image 301 and detect whether spoofing occurs.

The neural network 310 may include one or more convolution blocks 310-1 to 310-N (e.g., including a convolution block 310-2). When the one input image 301 is received, the neural network 310 may output a result 320 of detecting whether biometric information included in the input image 301 is spoofed, using the convolution blocks 310-1 to 310-N. The convolution blocks 310-1 to 310-N may be different from each other in, for example, a convolution kernel size, a total number of channels, and whether downsampling is performed, as non-limiting examples.

Hereinafter, the convolution block 310-2 included in the neural network 310 will be provided as an example of a convolution block, and various structures of this convolution block will be described with reference to FIGS. 4 to 7.

FIG. 4 illustrates an example structure of a convolution block, according to one or more embodiments. FIG. 4 illustrates an example of a structure of the convolution block 310-2 configured to generate output data for detecting whether spoofing occurs based on a feature map generated by a plurality of convolution layers 410, 420, and 430, and a feature map generated by the skip connection structure 405 that includes the pooling layer 440 and the zero-padding block 450.

For example, the convolution block 310-2 may include a first convolution layer 410, a second convolution layer 420, and a third convolution layer 430. Each of the convolution layers 410, 420, and 430 may generate respective feature maps by a respective scanning of pixels of a feature map input to a corresponding convolution layer corresponding to a respective kernel size k using one or more filters. Each convolution layer may also perform respective convolution operations for predicting a class to which each object or shape belongs in a corresponding image. Each of the convolution layers 410, 420, and 430 may also be considered as performing respective feature extractions or information gleaming from a feature map input to the corresponding convolution layer. Due to a loss of information occurring by each of such extractions or information gleaming by the convolution layers 410, 420, and 430, respective feature maps generated by the convolution layers 410, 420, and 430 may have different resolutions. For example, the respective feature maps may have different sizes and/or different total numbers of channels.

For example, the first convolution layer 410 may generate a first feature map based on a feature map (hereinafter, referred to as an "input feature map") that is input to the convolution block 310-2 and/or that is input to the first convolution layer 410. The first feature map may have the same size as a size of the input feature map but a different total number of channels from a total number of channels of the input feature map. The second convolution layer 420 may generate a second feature map based on the first feature map provided to the second convolution layer 420. The second feature map may have the same total number of channels as the total number of channels of the first feature map but a different size than the size of the first feature map. The third convolution layer 430 may generate a third feature map based on the second feature map provided to the third convolution layer 430. The third feature map may have the same size as the size of the second feature map, and a total number of channels of the third feature map may be the same as or different from the total number of channels of the second feature map. Here, such differences between the convolution layers 410, 420 and 430 are only non-limiting example differences and demonstrate only a non-limiting sequence of the convolution layers 410, 420 and 430. Further, while FIG. 4 provides an example with three convolution layers, there may be less than three convolution layers and there may be more than three convolution layers.

Accordingly, in an example, the first convolution layer 410 and the third convolution layer 430 may have a size of 1×1, and the second convolution layer 420 may be a depth-wise separable convolution (DWConv) layer with a size of k×k. Respective values of a kernel size k for the corresponding feature maps input to the first convolution layer 410, the second convolution layer 420, and the third convolution layer 430 may be variously set to, for example, "3" or "5", however, examples are not limited thereto.

In a non-limiting example, the illustrations of each of the convolution layers 410, 420, and 430 also represent a corresponding nonlinear activation function that may be included as example (e.g., final) operations of the convolution layers 410 and 420, or as example (e.g., final) operations of the convolution layers 410, 420, and 430, in the convolution block 310-2. Such nonlinear activation functions may be, for example, any of a rectified linear unit (ReLU) activation function or a Swish activation function, though examples are not limited thereto.

In an example, a total number of channels of the input feature map is $C_i$ and a size of the input feature map is height $h_i$×width $w_i$. In this example, the first convolution layer 410 with the size of 1×1 may output the first feature map $(nC_i \times h_i \times w_i)$ based on the input feature map $(C_i \times h_i \times w_i)$. Here, n may be a natural number greater than zero and may be different, e.g., slightly different, for each convolution block.

The second convolution layer 420 with the size k×k may output the second feature map $(nC_i \times h_o \times w_o)$ based on the first feature map $(nC_i \times h_i \times w_i)$, e.g., with the first feature map being input to the second convolution layer 420. Here, $h_o$ may correspond to a height of an output feature map of the convolution block 310-2, and $w_o$ may correspond to a width of the output feature map of the convolution block 310-2. When the second feature map $(nC_i \times h_o \times w_o)$ is compared to the first feature map $(nC_i \times h_i \times w_i)$, a channel value $nC_i$ may remain unchanged, but the height $h_o$ and width $w_o$ may be different from a height $h_i$ and a width $w_i$ of the first feature map. The second convolution layer 420 may alternatively be, for example, a group-wise convolution layer. Examples exist with respective various set values of a parameter group size of the group-wise convolution layer.

The third convolution layer 430 with the size of 1×1 may output the third feature map $(C_o \times h_o \times w_o)$ based on the second feature map $(nC_i \times h_o \times w_o)$, e.g., based on the second feature map being input to the third convolution layer 430. Here, the total number $C_o$ of channels of the third feature map may be the same as or different from the total number $C_i$ of channels of the input feature map.

The convolution block 310-2 may include the skip connection structure 405 including the pooling layer 440 and the channel zero-padding block 450. As a non-limiting example, the skip connection structure 405 may correspond to one or more connection paths that skips one or more all of the convolution layers 410, 420, and 430. In the following description, the skip connection structure 405 distinguished from the convolution layers 410, 420, and 430 may also be referred to as a "skip connection". Hereinafter, the expressions "skip connection" and "skip connection structure" may be understood to have the same meaning.

The skip connection structure 405 may be used to implement a summation (for example, y=f(x)+x) between a feature map f(x) resulting from the convolution layers 410, 420, and 430 and a feature map generated by the skip connection structure 405, e.g., dependent on the input feature map x that is first input to the convolution block 310-2 or input to the first convolution layer 410, or as the input feature map x without change when the optional pooling and the optional zero padding are not performed. In such examples with or without either of the optional pooling or optional zero padding, since the input feature map x may be preserved in y without some or any change, already extracted or otherwise gleamed information in the input feature map may be preserved and information that is to be further extracted or otherwise gleamed by the convolution layers 410, 420, and 430 may be added thereto. Accordingly, the convolution block 310-2 may have an effect that by using each of the convolution layers 410, 420, and 430 to respectively extract or otherwise gleam additional information based on the input feature map provided to the convolution layer 410 and by using the skip connection structure 405, the feature extraction of the convolution block 310-2 may be performed with a reduced loss of information from the input feature map, compared to a convolution block without such a skip connection where the result of the convolution block is merely the result of the respective extractions or gleaming of information using only plural convolution layers, where information of the input feature map may be lost by each subsequent convolution layer operation. In an example, a summation operation, between the feature map generated/forwarded by the skip connection structure 405 and a feature map resulting from the convolution layers 410, 420, and 430, may be performed, which may thereby reduce respective amounts of information that are to be extracted or otherwise gleamed by each of the convolution layers 410, 420, and 430 since some or all information from or of the input feature map is maintained. For example, even when either or both of the pooling and zero padding operations are performed in the skip connection structure 405, and the result of the skip connection 405 is added to the feature map resulting from the convolution layers 410, 420, and 430, some information of the input feature map is still maintained in the added result beyond the extracted information in the feature map resulting from the convolution layers 410, 420, and 430. Thus, it may be possible to enhance performance of detecting whether spoofing occurs with less, or without increasing, computational complexity with a small-sized neural network, for example.

To reduce an amount of information to be extracted or otherwise gleamed by each of the convolution layers 410, 420, and 430 using the skip connection structure 405, the skip connection structure 405 may match the size of the input feature map and the size of the output feature map using the pooling layer 440, and/or may match the total number $C_i$ of input channels of the convolution block 310-2 and the total number $C_o$ of output channels of the convolution block 310-2 using the channel zero-padding block 450. In an example, the pooling layer 440 and/or the channel zero-padding block 450 included in the skip connection structure 405 may be construed to illustrate that the pooling layer 440 and/or the channel zero-padding block 450 are directly connected to each other in the skip connection structure 405, though examples are not limited thereto.

In an example, when the size (height $h_i$×width $w_i$) of the input feature map of the convolution block 310-2 is different from the size (height $h_o$×width $w_o$) of the output feature map of the convolution block 310-2 (e.g., the size of the third feature map from the third convolution layer), the skip connection structure 405 may correct the size of the input feature map to the size of the output feature map using the pooling layer 440 included in the skip connection 405.

The pooling layer 440 may function to reduce a dimension by reducing a total number of parameters used in a filter. For example, the pooling layer 440 may reduce an amount of information, for example, a resolution, of a feature map by performing downsampling. As a non-limiting example, the pooling layer 440 may correct the size of the input feature map to be matched to the size of the output feature map by an average pooling scheme of performing pooling by an average of values according to a determined filter size. For example, the pooling layer 440 may correct the size (height $h_i$×width $w_i$) of the input feature map to the size (height $h_o$×width $w_o$) of the output feature map.

In another example, when the size of the input feature map of the convolution block 310-2 and the size of the output feature map of the convolution block 310-2 are the same, the skip connection 405 may directly output the feature map that is input to the convolution block 310-2 without passing through or using the pooling layer 440 (or the pooling layer 440 may not be included in the skip connection structure 405) to the element-wise summation 460, e.g., when the total number $C_i$ of input channels of the convolution block 310-2 and the total number $C_o$ of output channels of the convolution block 310-2 are the same.

Alternatively, when the total number $C_i$ of input channels of the convolution block 310-2 and the total number $C_o$ of output channels of the convolution block 310-2 are different, the skip connection structure 405 may match the total number of input channels and the total number of output channels using the zero-padding channel generated using the channel zero-padding block 450.

For example, when the total number $C_i$ of input channels of the convolution block 310-2 and the total number $C_o$ of output channels of the convolution block 310-2 are different, the skip connection structure 405 may generate a zero-padding channel using the channel zero-padding block 450. In this example, the zero-padding channel may correspond to a feature map or a feature vector filled with zeros, e.g., corresponding to the determined insufficient number of channels in an input feature map of a convolution block. The skip connection structure 405 may concatenate or combine the zero-padding channel to the input feature map of the convolution block 310-2 (or to the result of the pooling layer 440), to match the total number of input channels and the total number of output channels.

Figure 5:
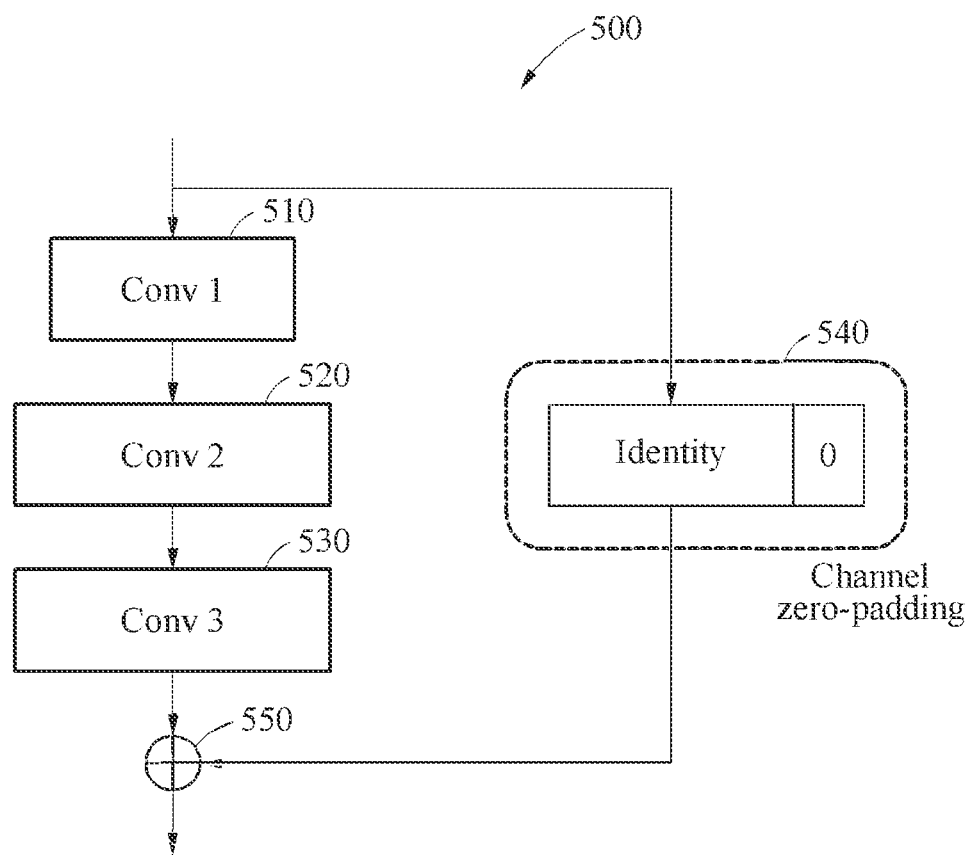

When both the total number $C_i$ of input channels of the convolution block 310-2 and the total number $C_o$ of output channels of the convolution block 310-2 are the same and the size of the input feature map of the convolution block 310-2 and the size of the output feature map of the convolution block 310-2 are the same, both the channel matching operation of the zero-padding channel addition and the size matching operation by the example pooling operation may not be performed, and the electronic apparatus may output to the element-wise summation 460 the input feature map by an identity skip connection that will be described below with reference to FIG. 5, according to one or more embodiments. For example, when such same sizes and total channel numbers are designed (e.g., based a size and total channel number of a captured image, and/or based on set parameters of the convolution blocks and respective convolution layers) to occur or otherwise predetermined or known prior to operation of the convolution block 310-2, the skip connection structure may be such an identify skip connection.

Accordingly, the electronic apparatus may generate output data for detecting whether spoofing occurs, based on the third feature map output by the third convolution layer 430 and the feature map generated by the skip connection structure 405. For example, the electronic apparatus may perform an element-wise summation 460 between the third feature map output through the third convolution layer 430 and the feature map generated by the skip connection structure 405, to thereby generate the output data of the convolution block 310-2.

The convolution block 310-2 is further representative of including one or more normalization layers respectively configured to normalize respective feature maps as generated by the convolution layers 410, 420, and/or 430, and the aforementioned respective nonlinear activation functions of the convolution layers 410, 420, and/or 430 respectively corresponding to the corresponding normalized feature maps.

In an example, by use of the skip connection structure 405, it may be possible to increase or maximize the use of a fine feature of an image and to reduce or minimize a possibility of a feature being lost in the processes of the convolution layers 410, 420, and 430. Also, in an example, by matching the total number of channels between each of the feature maps using the zero-padding channel generated by the channel zero-padding block 450, it may be possible to enhance spoofing detection performance instead of traditional approaches requiring significantly greater computation times and resources.

One or more examples include changed or different arrangement orders of the pooling layer 440 and the channel zero-padding block 450 in the skip connection structure 405.

FIG. 5 illustrates an example structure of a convolution block, according to one or more embodiments. FIG. 5 illustrates a convolution block 500 having an identity skip connection structure 540 that directly connects an input feature map, e.g., input to the convolution block or input to or provided toward a convolution layer 510 of a plurality of convolution layers of the convolution block 500, to an ultimate result of the plurality of convolution layers, e.g., convolution layers 510, 520, and 530. Here, while one skip connection structure is described for providing an identity skip connection structure that skips plural convolution layers, examples are not limited thereto.

For example, when the total number of input channels of the convolution block 500 and the total number of output channels of the convolution block 500 are the same, an input feature map to which a zero-padding channel is not added may be directly output by the identity skip connection structure 540. In this example, a result of a summation between the input feature map output directly by the identity skip connection structure 540 and a feature map output from the convolution layer 530, for example, may be output data indicative of spoofing attempt/occurrence and/or output data for detecting whether spoofing has been attempted or is occurring.

Figure 6:
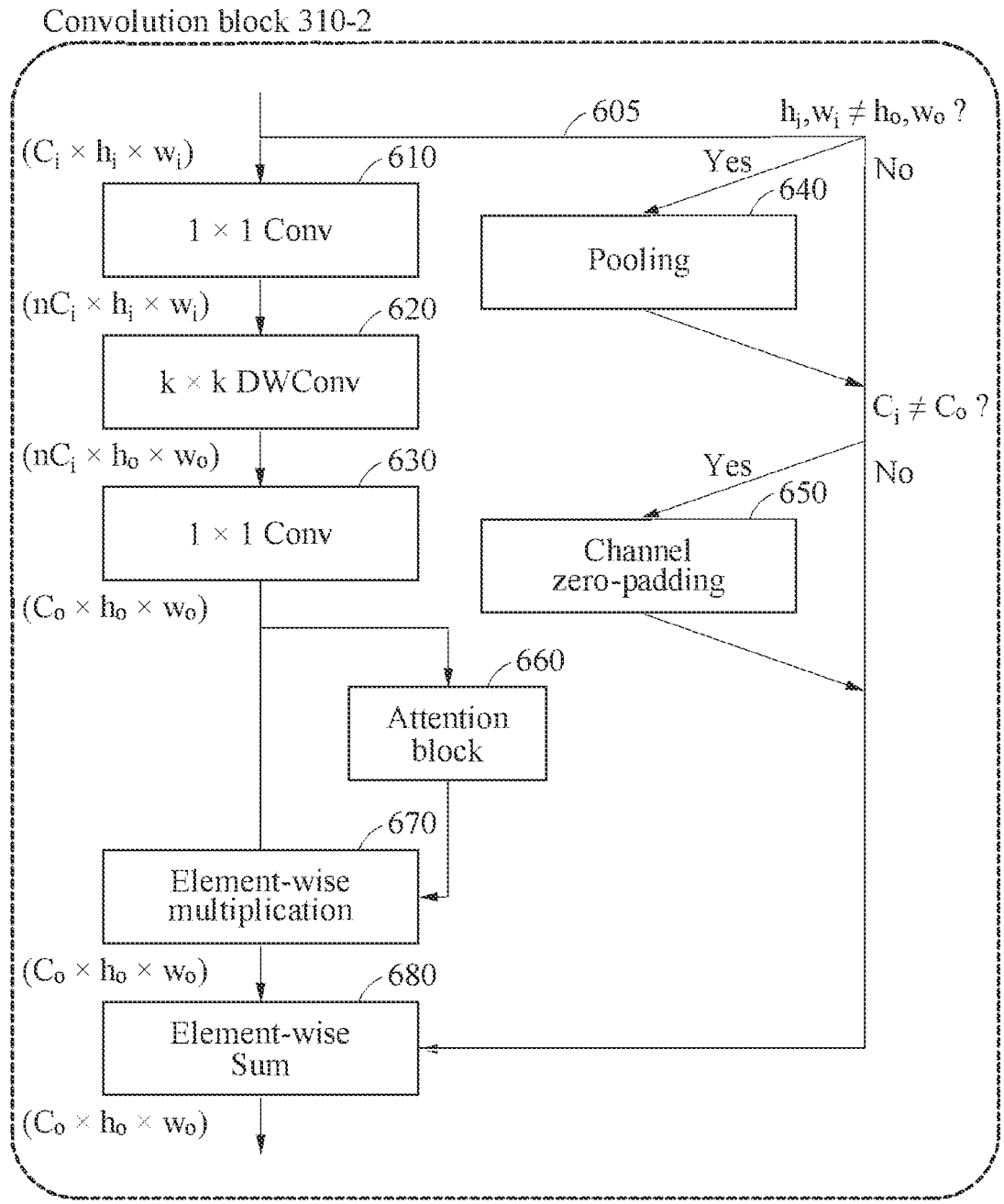

FIG. 6 illustrates an example of a structure of a convolution block, according to one or more embodiments. As a non-limiting example, FIG. 6 illustrates a structure of the convolution block 310-2 to generate output data for detecting whether spoofing occurs, based on a feature map that is ultimately generated as the result of a plurality of convolution layers 610, 620, and 630 with respect to an input feature map, where weightings are assigned to one or more or each channel of the generated feature map using an attention layer included in an attention block 660. The generating of the output data for detecting whether spoofing occurs is thus based on the generated feature map with the assigned weightings and a feature map generated by a skip connection structure 605, which includes the result of a pooling layer 640 with respect to the input feature map being provided to a channel zero-padding block.

The convolution layers 610, 620, and 630, the pooling layer 640, and the channel zero-padding block 650 of FIG. 6 may respectively correspond to the convolution layers 410, 420, and 430, the pooling layer 440, and the channel zero-padding block 450 of FIG. 4, for example, and accordingly a configuration and operations of FIG. 6 that may be different from those of FIG. 4 will be mainly described below.

Since an authentication image has a great variety of types of fine features for determining whether spoofing occurs, an electronic apparatus may determine whether spoofing occurs based on a large number of features such as an overall shape or low noise, in addition to local features, as non-limiting examples.

In an example, training may be performed to assign a weight to a channel for extracting a fine feature using the attention block 660 for each convolution block, for example, and thus it may be possible to enhance performance of the detecting of whether spoofing occurs. The attention block 660 may be implemented with a plurality of fully connected layers, which may not require significant computations, and accordingly the performance of detecting whether spoofing occurs may be enhanced with little difference in a computation time from an example embodiment in which the attention block 660 is absent or not utilized in the convolution block 310-2, which will be further described below with reference to FIG. 8.

The electronic apparatus may assign weights for each channel of the generated feature map using the attention block 660 included in the convolution block 310-2. For example, the electronic apparatus may assign weights for each channel of the generated feature map using the attention block 600 according to a determined or observed importance of each channel of the generated feature map by the attention block 660. Thus, the electronic apparatus may generate an attention map by assigning weights for each channel of the generated feature map. In this example, the electronic apparatus may generate output data for detecting whether spoofing occurs, based on the generated feature map with the assigned weights (hereinafter, referred to a "channel attention map") and the feature map result of the skip connection structure 605, e.g., which may include a zero-padding channel added to the input feature map using the channel zero-padding block 650 or which may include the zero-padding channel that has been added to the result of the pooling layer 640, which is based on or dependent on the input feature map, such as based on the pooling operation of the input feature map. Each element of the channel attention map may also indicate an attention probability for each channel.

Examples include various other arrangement positions of the attention block 660 with respect to the plurality of convolution layers, for example.

For example, the attention block 660 may be disposed after the third convolution layer 630 among the convolution layers 610, 620, and 630 in the convolution block 310-2 as shown in FIG. 6. In this example, the electronic apparatus may assign weights for each channel of the third feature map generated by the third convolution layer 630 among the convolution layers 610, 620, and 630. For example, the electronic apparatus may perform an element-wise multiplication 670 between the third feature map generated by the third convolution layer 630 and an attention weighting map result of the attention block 660 for the generated third feature map, to assign weights for each channel of the third feature map according to the attention weighting result of the attention block 660. The electronic apparatus may perform an element-wise summation 680 between the third feature map with the assigned weights and the feature map generated by (output from) the skip connection structure 605. An example in which the arrangement position of the attention block 660 is different from that of FIG. 6 will be described below with reference to FIG. 7, noting that examples are not limited to either example arrangement position of the attention block 660 of FIG. 6 or the attention block 730 of FIG. 7.

Figure 7:
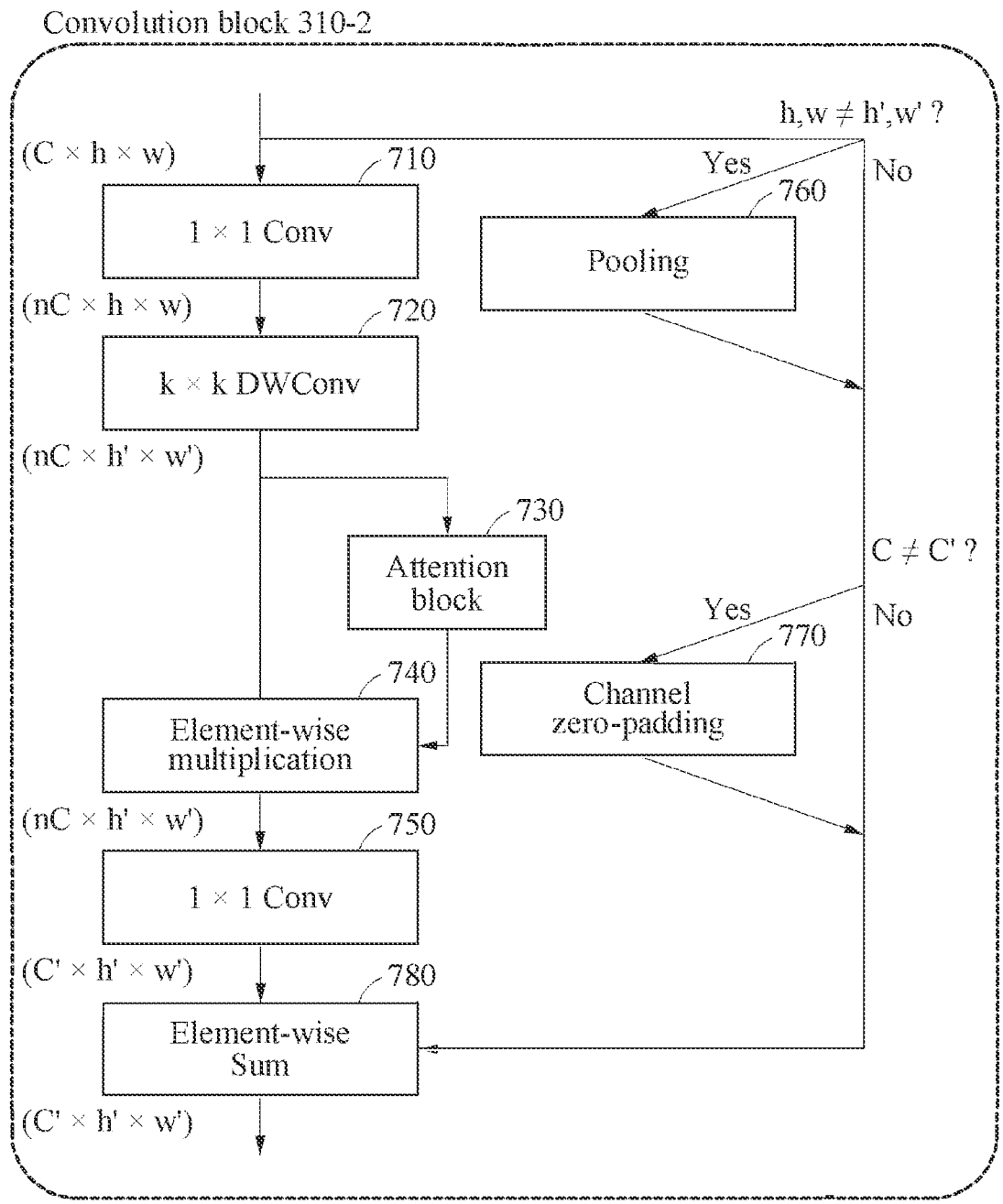

FIG. 7 illustrates an example structure of a convolution block, according to one or more embodiments. FIG. 7 illustrates a structure of a convolution block 310-2 to generate output data for detecting whether spoofing occurs, based on a result (for example, a third feature map) generated by a third convolution layer 750 provided a second feature map, e.g., output from an example second convolution layer 720, to which weights have been assigned for each channel of the second feature map using an attention layer included in an attention block 730. The result of the convolution block 310-2, e.g., the output data for detecting or indicative of spoofing, may be based on this third feature map and the feature map generated by the skip connection structure 705 which includes a pooling layer 760 and a channel zero-padding block 770.

Convolution layers 710 and 720, the skip connection structure 705, including the pooling layer 760 and the channel zero-padding block 770, of FIG. 7 may respectively correspond to the convolution layers 410 and 420 and the skip connection structure 405, including the pooling layer 440 the channel zero-padding block 450, of FIG. 4. In addition, the consideration of whether the height h' is different from the height $h_i$, the consideration of whether the width w' is different from the width w, and the consideration of whether the channel size C' is different from the channel size C in FIG. 7 may also be respectively alike or the same as the consideration of whether the height $h_o$ is different from the height $h_i$, the consideration of whether the width $w_o$ is different from the width $w_i$, and the consideration of whether the channel size $C_o$ is different from the channel size $C_i$ in FIG. 4, and accordingly example aspects of FIG. 7 that may be different from that of FIG. 4 are described below.

The attention block 730 may be disposed between the second convolution layer 720 and the third convolution layer 750 among the convolution layers 710, 720, and 750 included in the convolution block 310-2. In this example, an electronic apparatus may assign weights for each channel of a second feature map generated by the second convolution layer 720 by using the attention block 730 provided the generated second feature map. The electronic apparatus may perform an element-wise multiplication 740 between the generated second feature map and an attention weighting map result of the attention block 730 with respect to the generated second feature map, to assign the weights for each channel of the generated second feature map. This second feature map with the assigned weightings is then provided to the third convolution layer 750, which generates the third feature map. Accordingly, in this example, the electronic apparatus may detect or indicate whether biometric information is spoofed based on the third feature map, which is dependent on the result of the assigning of the weights for each channel of the generated second feature map, and based the feature map generated by the skip connection structure 705, e.g., dependent on the feature map resulting from the pooling layer 760 and/or the channel zero-padding block 770 in the skip connection structure 705. For example, an element-wise summation 780 may be performed with respect to the third feature map, resulting from the third convolution layer 750 provided the second feature map with the assigned weightings, and the feature map generated by the skip connection structure 705, to generate output data for a detection of, or as an indication of, whether biometric information is spoofed.

Figure 8:
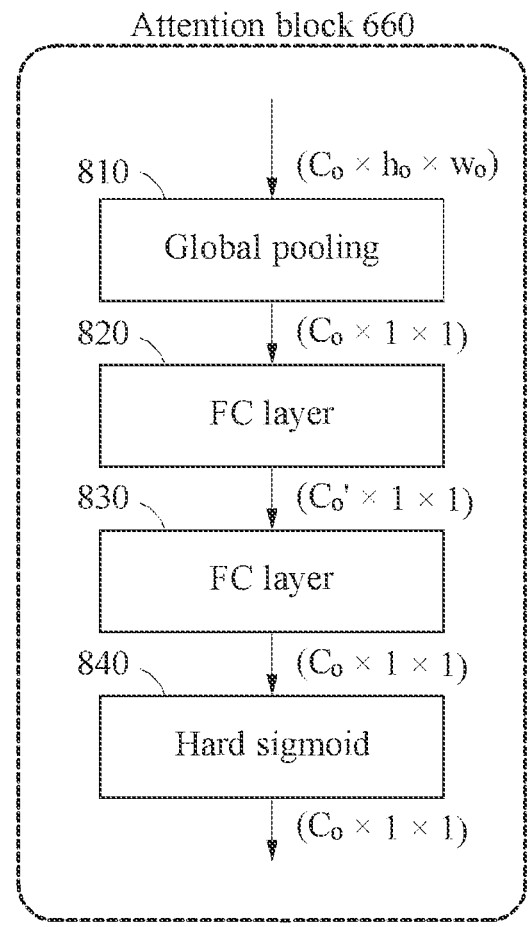
FIG. 8 illustrates an example structure of an attention block, according to one or more embodiments.

FIG. 8 illustrates an example structure of an attention block, according to one or more embodiments. FIG. 8 illustrates an attention block 660 that includes a global pooling layer 810, a first fully connected (FC) layer 820, and a second fully connected layer 830, and an attention layer such as a hard sigmoid activation function 840, as a non-limiting example.

As a non-limiting example, the global pooling layer 810 may generate a feature vector or a feature map with a size of $C_o \times 1 \times 1$ by allowing values of $h_o$ and $w_o$ in a feature map $(C_o \times h_o \times w_0)$ provided to the global pooling layer 810 to be "1" using, for example, a global average pooling scheme of resizing a feature map generated by a convolution layer (e.g., the feature map provided to the global pooling layer 810) to be $1 \times 1$.

The first fully connected layer 820 may smooth the resulting feature map or resulting feature vector resized generated by the global pooling layer 810. For example, the resized feature map $(C_o \times 1 \times 1)$ may be converted into a single vector $(C_o' \times 1 \times 1)$ using the first fully connected layer 820. In this example, a $1 \times 1$ convolution layer may also be used instead of the first fully connected layer 820.

The second fully connected layer 830 may smooth an output of the first fully connected layer 820. The single vector $(C_o' \times 1 \times 1)$ output from the first fully connected layer 820 may be smoothed to a single vector $(C_o \times 1 \times 1)$ using the second fully connected layer 830.

The attention block 660 may apply the hard sigmoid activation function 840 to the single vector $(C_o \times 1 \times 1)$ that is output by the second fully connected layer 830. The hard sigmoid activation function 840 may be a modified function to reduce a loss due to quantization in a sigmoid function, and may be represented as, for example, Equation 1 below.

$$\text{Hard Sigmoid}(x) = \frac{ReLU6(x+3)}{6} \quad \text{Equation 1}$$

In Equation 1, ReLU6 may correspond to an activation function, and x may correspond to an input.

The hard sigmoid activation function 840 may correspond to an example of a nonlinear activation function layer. Examples also include those where the hard sigmoid activation function 840 is alternatively one of various other nonlinear activation functions, for example, a softmax function, or a hyperbolic tangent (tanh) function, as non-limiting examples.

The softmax function may correspond to an activation function that normalizes an input value to a value between "0" and "1" and allows a sum of output values to be "1" at all times. Also, the hyperbolic tangent function may correspond to an activation function in which a size and a position of a sigmoid function are rescaled and shifted.

Figure 9:
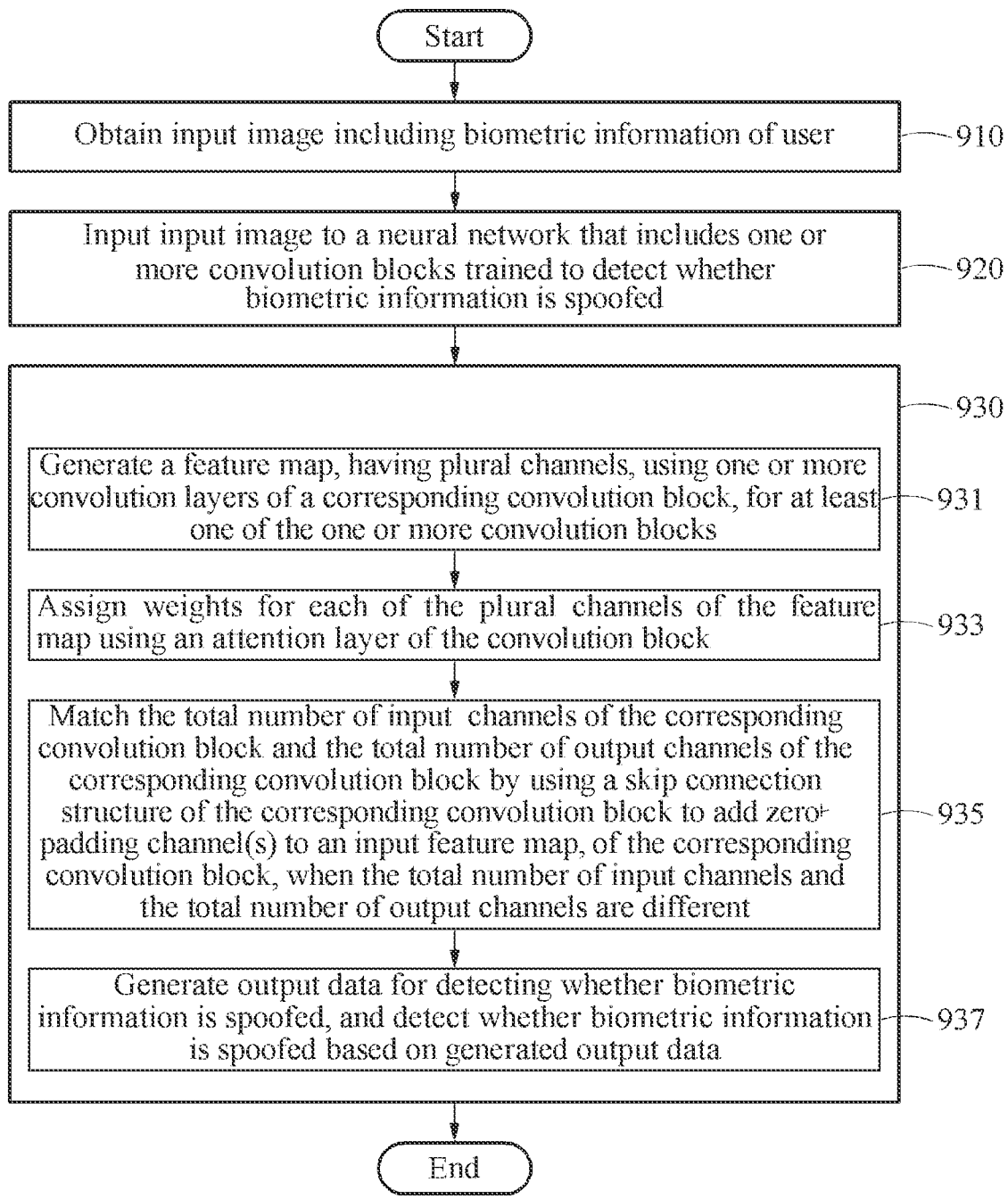
FIG. 9 illustrates an example of a method of determining whether biometric information is spoofed, according to one or more embodiments.

FIG. 9 illustrates an example of a method of detecting whether biometric information is spoofed, according to one or more embodiments. In the following example, operations may be sequentially performed, but are not necessarily performed in a sequence. For example, the order of operations may be changed, and at least two operations may be performed in parallel.

FIG. 9 illustrates an example process in which an electronic apparatus detects whether biometric information is spoofed.

In operation 910, the electronic apparatus may obtain an input image including biometric information of a user.

In operation 920, the electronic apparatus may input the input image obtained in operation 910 to a machine learning model, e.g., a neural network, that includes one or more convolution blocks trained to detect and/or generated data for detecting whether biometric information is spoofed.

In operation 930, the electronic apparatus may detect whether the biometric information is spoofed based on output data output from or by the one or more convolution blocks. The electronic apparatus may detect whether the biometric information is spoofed by performing operations 931 to 937, using one or more of the convolution blocks.

In operation 931, the electronic apparatus may generate a feature map including a plurality of channels using one or more of a plurality of convolution layers included in a corresponding convolution block among the one or more convolution blocks.

In operation 933, the electronic apparatus may assign weights for each channel of the feature map generated in operation 931 using an attention layer included in the corresponding convolution block.

In operation 935, the electronic apparatus may use a skip connection structure included in the corresponding convolution block to generate a feature map that matches a total number of input channels of the corresponding convolution block and a total number of output channels of the corresponding convolution block by adding a zero-padding channel to an input feature map of the corresponding convolution block, when the total number of input channels and the total number of output channels are different.

In operation 937, the electronic apparatus may generate output data for detecting or indicating whether the biometric information is spoofed, dependent on the feature map with the assigned weights generated in operation 933 and dependent the feature map generated by the skip connection structure in operation 935. The electronic apparatus may determine whether a corresponding input image is a spoofed image based on the generated output data.

FIG. 10 illustrates an example of a structure of a neural network, according to one or more embodiments. FIG. 10 illustrates neural networks 1010 and 1030 configured to detect whether biometric information is spoofed from a plurality of input images, for example, a first input image 1001 and at least a second input image 1003, noting that additional input images may further be considered in similar manner.

For example, when a plurality of input images, for example, the first input image 1001 and the second input image 1003, are provided, an electronic apparatus may respectively input the plurality of input images to a plurality of neural networks, for example, the neural networks 1010 and 1030, respectively corresponding to the plurality of input images.

The first input image 1001 may correspond to, for example, a raw image captured by a sensor. The second input image 1003 may be, for example, an image obtained by capturing biometric information of a user at a different time from the first input image 1001. The image obtained by capturing the biometric information may be, for example, an image obtained in an authentication matching process of verifying whether a user attempting authentication has the authority to access one or more functions, operations, or capabilities of the electronic apparatus. The second input image 1003 may also be, for example, an image obtained by performing nonlinear image processing on the first input image 1001. The nonlinear image processing may include, for example, removing noise of the first input image 1001, and/or increasing a signal-to-noise ratio (SNR) of the first input image 1001, as non-limiting examples.

The first input image 1001 may be input to the first neural network 1010, and the second input image 1003 may be input to the second neural network 1030.

The electronic apparatus may detect whether biometric information is spoofed, based on respective output data output by each neural network 1010 and 1030 for each of the plurality of input images 1001 and 1003, e.g., respectively using convolution blocks 1010-1 through 1010-N (including a convolution block 1010-2) included in the first neural network 1010 and convolution blocks 1030-1 through 1030-N (including a convolution block 1030-2) included in the second neural network 1030. For example, the electronic apparatus may perform an element-wise summation 1050 on output data output from each of the neural networks 1010 and 1030 and may detect whether the biometric information is spoofed in operation 1060. In this example, each of the convolution blocks 1010-1 through 1010-N and 1030-1 through 1030-N may have the structure of the convolution block 310-2 described above. As a non-limiting example, the neural networks 1010 and 1030 may have identical characteristics and may be implemented in parallel, or a single neural network 1010 or 1030 may be used repetitively for each input image in sequence.

Figure 11:
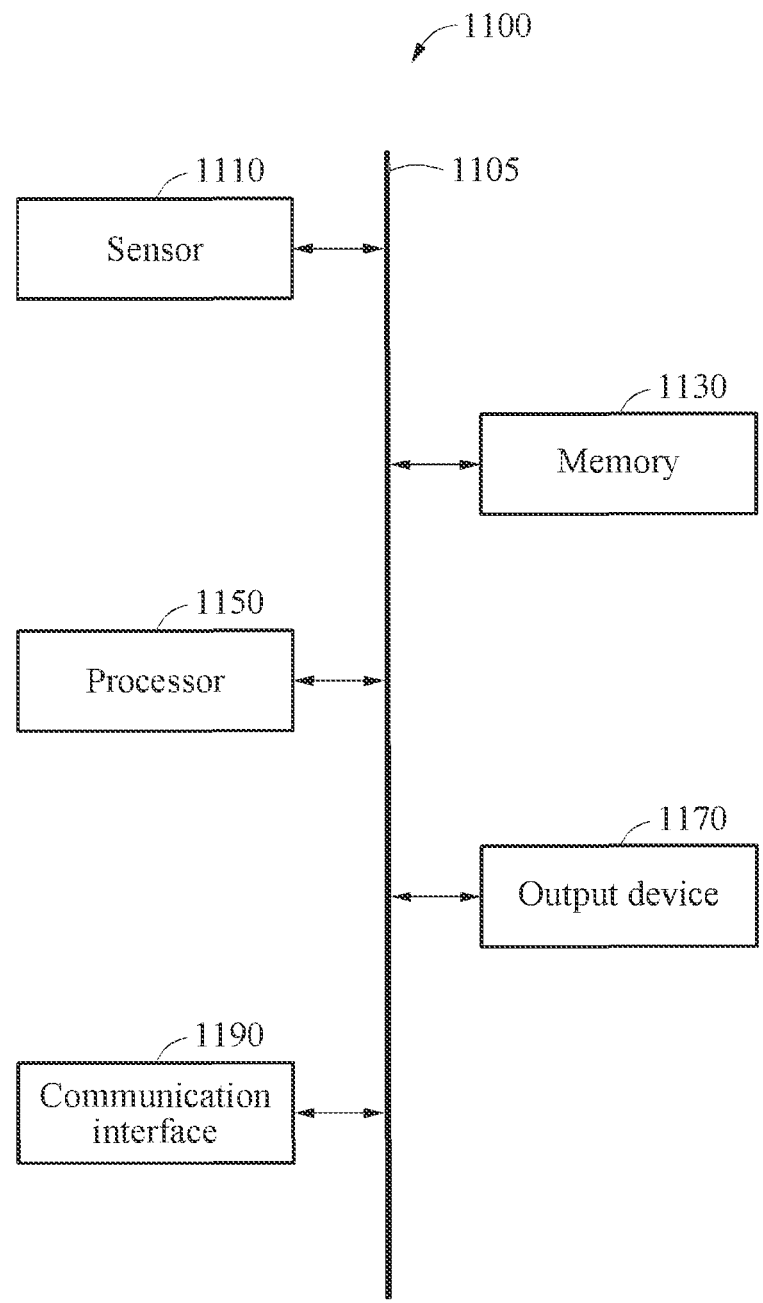
FIG. 11 illustrates an example of an electronic apparatus configured to perform biometric fingerprint authentication with spoofing avoidance, according to one or more embodiments.

FIG. 11 illustrates an example electronic apparatus configured to perform biometric fingerprint authentication with spoofing avoidance, according to one or more embodiments. Referring to FIG. 11, an electronic apparatus 1100 may include a sensor 1110, a memory 1130, a processor 1150, an output device 1170, and a communication interface 1190, as non-limiting examples. The sensor 1110, the memory 1130, the processor 1150, the output device 1170, and the communication interface 1190 may be connected to each other via a communication bus 1105, as a non-limiting example.

The sensor 1110 may capture an input image including biometric information of a user. Such as discussed above with respect to the sensors 110 and 112, the sensor 1110 may be or include, for example, any one or any combination of an ultrasonic fingerprint sensor, an electrostatic fingerprint sensor, an optical sensor, an iris sensor, a depth sensor, a vision sensor, and an image sensor, but is not limited thereto. A single sensor 1110, or a plurality of sensors 1110, may be provided. The biometric information may include, for example, one of a fingerprint, an iris, a palm, and a face of a user, but examples are not limited thereto.

The memory 1130 may store one or more neural networks, each including one or more convolution blocks trained to detect whether biometric information is spoofed from one or more input images captured by the sensor(s) 1110.

The memory 1130 may store biometric information of a user sensed by the sensor 1110, that is, images obtained by capturing the biometric information of the user in an example registration process. The memory 1130 may store output data and/or feature maps generated by the processor 1150. Also, the memory 1130 may store biometric information and information regarding whether the biometric information is spoofed, detected by the processor 1150, by matching them to each other.

The memory 1130 may store a variety of information generated in processing processes of the processor 1150 described above, as non-limiting examples. In addition, the memory 1130 may store a variety of additional data and applications or programs of the system of the electronic apparatus. The memory 1130 may include, for example, a volatile memory or a non-volatile memory. The memory 1130 may include a large-capacity storage medium such as a hard disk to store a variety of data.

The processor 1150 may input the input image captured by the sensor 1110 to the neural network stored in the memory 1130. The processor 1150 may control the capturing of the input image or may merely be provided the captured image. In varying examples, the processor 1150 may also input an input image received through the communication interface 1190 to the neural network, e.g., from an external terminal or camera, or received through the communication bus 1105, such as from the memory 1130. The processor 1150 may detect whether biometric information is spoofed based on output data output by convolution blocks included in the neural network. For example, the processor 1150 may detect whether the biometric information is spoofed by performing the following non-limiting operations, corresponding to one or more of the aforementioned convolution blocks for each of one or more neural networks respectively for one or more input images.

The processor 1150 may generate a feature map including a plurality of channels through performance of one or more convolution layers included in a corresponding convolution block of a corresponding neural network, for example. When a total number of input channels of the corresponding convolution block and a total number of output channels of the corresponding convolution block are different, the processor 1150 may use a skip connection structure of the corresponding convolution block to match the total number of input channels and the total number of output channels by adding a zero-padding channel to an input feature map of the corresponding convolution block. The processor 1150 may generate output data for detecting whether spoofing occurs dependent on results of the one or more convolution layers and dependent on the result of the skip connection structure.

The processor 1150 may also use a buffer memory configured to store one or more layers or a series of calculation data, to process the neural network in a layered sequence.

However, the operation of the processor 1150 is not limited to the above description, and the processor 1150 may also perform the above-described operation together with one or more or all of the operations described above with reference to FIGS. 1 to 10.

The processor 1150 may be a hardware-implemented neural network processor or a processor which includes such a hardware-implemented neural network processor, and/or a processor in communication with the memory 1130, for example, storing instructions, which when executed by the processor, configure to the processor to perform one or more or all operations or methods described herein. The processor 1150 may be plural processors, any of which may include circuits having a physical structure configured to perform other operations of the electronic apparatus, and/or configured to execute stored instructions, which when executed by an example processor, configure to the example processor to perform such other operations of the electronic apparatus, such as the selective provision of access to the system of the electronic apparatus, dependent on the authentication of the user's fingerprint. For example, the hardware-implemented electronic apparatus may include a microprocessor, a central processing unit (CPU), a graphics processing unit (GPU), a processor core, a multi-core processor, a multiprocessor, an application-specific integrated circuit (ASIC), a field-programmable gate array (FPGA), or a neural processing unit (NPU), as non-limiting examples.

The output device 1170 may output the information regarding whether the biometric information is spoofed, detected by the processor 1150 to the inside (e.g., to control or not control other operations of functions of the electronic apparatus 1100) or the outside of the electronic apparatus 1100. The output device 1170 may include, for example, a display, an alarm, a speaker, or other various types of output devices capable of notifying a user of whether biometric information is spoofed. Alternatively, the output device 1170 may provide a notification that an authentication has failed based on whether the input image or corresponding feature data is verified to sufficiently match a registered image/feature data, and/or the output of the neural network detects or indicates that the input image is a spoofed input image, or the output device 1170 may merely not change any output of information to a user, e.g., to not permit access to the system of the electronic apparatus 1100, when such authentication has failed. Alternatively, when authentication has succeeded then the user may be provided access to the system of the electronic apparatus 1100.

In an example, the communication interface 1190 may output the information regarding whether the biometric information is spoofed, detected by the processor 1150 to the outside of the electronic apparatus 1100. In another example, the communication interface 1190 may transmit the biometric information together with the information regarding whether the biometric information is spoofed, detected by the processor 1150 to another apparatus. In this example, the biometric information and the information regarding whether the biometric information is spoofed may be matched with each other, e.g., for collective consideration of whether the corresponding user is authenticated.

In various examples, the communication interface 1190 may receive an image obtained by capturing biometric information of a user from the outside of the electronic apparatus 1100 and may transfer the image to the processor 1150.

As non-limiting examples, the electronic apparatus 1100 may be the smartphone electronic apparatus 100 of FIG. 1, or any of various other mobile electronic apparatuses of FIGS. 1-10, that may perform or not perform operations of the electronic apparatus 100 based on results of the authentication and/or spoofing detection. In another example, the electronic apparatus 1100 is an authentication or spoofing detection module or apparatus of the electronic apparatus 100, as a non-limiting example, where such performance or non-performance of operations of the electronic apparatus 1100 may be dependent on an output of the authentication or spoofing detection module or apparatus, and the processor 1150 or other processors represented by the electronic apparatus 1100 are configured to perform such other operations of the electronic apparatus 1100.

The electronic apparatuses, authentication or spoofing detection modules, sensors, memories, processors, output devices, communication interfaces, communication buses, cameras, as non-limiting examples, and other apparatuses, devices, modules, elements, and components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
implementing one or more of a plurality of convolution blocks of a machine learning model that determines whether biometric information in at least an input image is spoofed, including:
generating a feature map including a plurality of channels for an input feature map for the input image using one or more convolution layers of a convolution block of the one or more convolution blocks; and
generating output data, for determining whether the biometric information is spoofed, dependent on the generated feature map and a result of a skip connection structure of the convolution block,
wherein the convolution block includes an attention mechanism,
wherein, when a total number of input channels of the convolution block and a total number of output channels of the convolution block are different, the total number of input channels of the convolution block are matched with the total number of output channels of the convolution block using the skip connection structure of the convolution block,
wherein the attention mechanism assigns respective weights for channels of the feature map using an attention layer included in the convolution block, and
wherein the generating of the output data comprises generating the output data for determining whether the biometric information is spoofed de pendent on a result of the assigning of the respective weights for the channels of the feature map and dependent on a result of the skip connection structure that adds zero-padding channel to the feature map.

2. The method of claim 1, further comprising determining whether biometric information in the input image is spoofed dependent on the generated output data.

3. The method of claim 1, wherein the one or more convolution blocks includes at least two convolution blocks, and wherein the method further comprises:
generating an additional feature map including another plurality of channels for the generated output data of the convolution block, as a corresponding other feature map, using one or more convolution layers of another convolution block of the two or more convolution blocks; and
generating a determination of whether the biometric information is spoofed dependent on the generated additional feature map and a result of a skip connection structure of the other convolution block,
wherein, when a total number of input channels of the other convolution block and a total number of output channels of the other convolution block are different, the total number of input channels of the other convolution block are matched with the total number of output channels of the other convolution block using the skip connection structure of the other convolution block.

4. The method of claim 3, wherein
the convolution block and the other convolution block have different convolution parameters, and
the different convolution parameters comprise any one or any combination of different respective convolution layer channel multiplication sizes between the convolution block and the other convolution block, different respective convolution kernel sizes of at least one respective convolution layer between the convolution block and the other convolution block, and different respective total numbers of channels of respectively generated feature maps of the convolution block and the other convolution block.

5. The method of claim 1, wherein the total number of input channels of the convolution block and the total number of output channels of the convolution block are different, and
wherein the using of the skip connection structure of the convolution block includes adding a zero padding channel to the feature map.

6. The method of claim 3,
wherein the machine learning model is a neural network,
wherein the total number of input channels of the convolution block and the total number of output channels of the convolution block are different, and
wherein the using of the skip connection structure of the convolution block includes adding a zero padding channel to the feature map and/or the using of the skip connection structure of the other convolution block includes adding a zero padding channel to the corresponding other feature map.

7. The method of claim 6, wherein the neural network includes at least the convolution block and at least the other convolution block.

8. The method of claim 1, wherein the plurality of convolution blocks include another one or more convolution blocks, and wherein the method further comprises:
generating an additional feature map including another plurality of channels for a corresponding input feature map for another input image using one or more convolution layers of another convolution block of the one or more convolution blocks; and
generating another output data, for determining whether biometric information of the other input image is spoofed, dependent on the generated additional feature map and a result of a skip connection structure of the other convolution block.

9. A processor-implemented method, the method comprising:
implementing two or more of a plurality of convolution blocks of a machine learning model that determines whether biometric information in at least an input image is spoofed, including:
generating a feature map including a plurality of channels for an input feature map for the input image using one or more convolution layers of a convolution block of the two or more convolution blocks;
generating output data, for determining whether the biometric information is spoofed, dependent on the generated feature map and a result of a skip connection structure of the convolution block;
generating an additional feature map including another plurality of channels for a corresponding input feature map for another input image using one or more convolution layers of another convolution block of the two or more convolution blocks; and generating another output data, for determining whether biometric information of the other input image is spoofed, dependent on the generated additional feature map and a result of a skip connection structure of the other convolution block, wherein the generating of feature map and the additional feature map are performed in parallel, wherein, when a total number of input channels of the convolution block and a total number of output channels of the convolution block are different, the total number of input channels of the convolution block are matched with the total number of output channels of the convolution block using the skip connection structure of the convolution block, and wherein, when a total number of input channels of the other convolution block and a total number of output channels of the other convolution block are different, the total number of input channels of the other convolution block are matched with the total number of output channels of the other convolution block using the skip connection structure of the other convolution block.

10. The method of claim 9, further comprising generating a combined determination of whether the biometric information is spoofed dependent on the generated output data and dependent on the generated other output data, wherein the total number of input channels of the convolution block and the total number of output channels of the convolution block are different and/or the total number of input channels of the other convolution block and the total number of output channels of the other convolution block are different.

11. The method of claim 10, wherein one or both of the convolution block and the other convolution block respectively include an attention mechanism.

12. The method of claim 8, wherein the machine learning model includes a neural network that includes at least the convolution block, and another neural network that includes at least the other convolution block, or the machine learning model is a neural network that includes at least the convolution block and at least the other convolution block.

13. The method of claim 1, further comprising:
obtaining the input image, the input image including biometric information of a user;
inputting the input image to the machine learning model; and
determining whether the input image includes spoofed biometric information dependent at least on the generated determination.

14. The method of claim 1, wherein the matching of the total number of input channels and the total number of output channels is performed in response to a performed determination that the total number of input channels and the total number of output channels being different, and includes concatenating a zero-padding channel in the skip connection structure corresponding to a determined insufficient number of channels in the input feature map of the convolution block to the input feature map.

15. The method of claim 1,
wherein the matching of the total number of input channels and the total number of output channels is selectively performed, with the matching not being performed in response to the total number of input channels and the total number of output channels being determined same, and where performance of the skip connection structure when the matching is not performed includes outputting the input feature map as an identity skip connection as the result of the skip connection structure of the convolution block.

16. The method of claim 1, further comprising:
in response to a non-channel size of an input feature map of the convolution block and a non-channel size of an output feature map of the convolution block being different, matching the non-channel size of the input feature map and the non-channel size of the output feature map using a pooling layer included in the skip connection structure for generating the result of the skip connection structure of the convolution block.

17. The method of claim 16, further comprising:
in response to the non-channel size of the input feature map and the non-channel size of the output feature map being same, implementing the skip connection structure without implementation of the pooling layer.

18. The method of claim 1, wherein
the one or more convolution blocks include at least two convolution blocks that have different convolution parameters, and
the different convolution parameters comprise any one or any combination of different respective convolution layer channel multiplication sizes between the at least two convolution blocks, different respective convolution kernel sizes of at least one respective convolution layer between the at least two convolution blocks, and different respective total numbers of channels of respectively generated feature maps of the at least two convolution blocks.

19. The method of claim 1, wherein, with respect to the generating of the feature map, the convolution block comprises:
a first convolution layer with a size of 1×1 configured to generate a first feature map dependent on the input feature map, the first feature map having a same size as a size of the input feature map and a different total number of channels from a total number of channels of the input feature map;
a second convolution layer with a size of k×k configured to generate a second feature map dependent on the first feature map, the second feature map having a same total number of channels as the total number of channels of the first feature map and a size obtained by changing the size of the first feature map, where k is a natural number greater than zero; and
a third convolution layer with a size of 1×1 configured to generate a third feature map dependent on the second feature map, the third feature map having a same size as the size of the second feature map and a same total number of channels as, or a different total number of channels from, the total number of channels of the second feature map.

20. The method of claim 19, wherein the second convolution layer comprises one of a depth-wise separable convolution layer and a group-wise convolution layer.

21. The method of claim 19, wherein the convolution block further comprises at least one of:
one or more normalization layers configured to respectively normalize the generated first feature map, the generated second feature map, and/or the generated third feature map; and
one or more nonlinear activation functions respectively provided to the normalized first feature map, the normalized second feature map, and/or the normalized third feature map.

22. The method of claim 21, wherein the second convolution layer is configured to generate the second feature map based on a result of a first nonlinear activation function of the one or more nonlinear activation functions that is provided the normalized first feature map, the third convolution layer is configured to generate the third feature map based on a result of a second nonlinear activation function of the one or more nonlinear activation functions that is provided the normalized second feature map, and/or the generating of the output data is based on a result of a third nonlinear activation function of the one or more nonlinear activation functions that is provided the normalized third feature map.

23. The method of claim 1, wherein the attention mechanism assigns respective weights for channels of a corresponding feature map, generated dependent on the one or more convolution layers, using an attention layer included in the convolution block, and
wherein the assigning of the respective weights for the channels of the corresponding feature map comprises assigning, according to determined importances of each channel of the corresponding feature map, respective weights for each channel of the corresponding feature map using the attention layer.

24. The method of claim 1, wherein the one or more convolution layers of the convolution block include at least three convolution layers,
the attention layer is disposed after a third convolution layer among the at least three convolution layers, and
the assigning of the respective weights includes assigning respective weights for each channel of a feature map resulting from the third convolution layer.

25. The method of claim 1, wherein the one or more convolution layers of the convolution block include at least three convolution layers,
the attention layer is disposed between a second convolution layer and a third convolution layer among the at least three convolution layers, and
the assigning of the respective weights includes assigning respective weights for each channel of a feature map resulting from the second convolution layer and prior to the third convolution layer.

26. The method of claim 1, wherein the attention layer comprises:
a global pooling layer configured to resize a corresponding feature map, generated by one of the one or more convolution layers, to a size of 1×1;
a first fully connected layer configured to convert the resized corresponding feature map into a single vector by smoothing the resized corresponding feature map;
a second fully connected layer configured to smooth an output of the first fully connected layer; and
a nonlinear activation function configured to change a form of an output of the second fully connected layer.

27. The method of claim 26, wherein the nonlinear activation function comprises one of a hard sigmoid function, a softmax function, and a hyperbolic tangent (tanh) function.

28. The method of claim 1, wherein the method further includes respectively inputting a plurality of images, including the input image, to a plurality of neural networks each configured to generate data for determining whether biometric information in a corresponding input image of the input plurality of images is spoofed, where each of the plurality of neural networks includes one or more corresponding convolution blocks with at least one of the plurality of neural networks being input the input image and includes the convolution block, and
determining whether a biometric information for any of the plurality of images is spoofed dependent on a plurality of each of on the generated data.

29. The method of claim 28, wherein the determining of whether the biometric information for any of the plurality of images is spoofed includes an element-wise summation of each of the generated data.

30. The method of claim 1, further comprising obtaining the input image using any one or any combination of an ultrasonic fingerprint sensor, an electrostatic fingerprint sensor, an optical fingerprint sensor, an iris sensor, a depth sensor, and an image sensor.

31. The method of claim 1, wherein the biometric information comprises one of a fingerprint, an iris, and a face of the user.

32. A non-transitory computer-readable storage medium storing instructions that, when executed by a processor, cause the processor to perform the method of claim 1.

33. An apparatus, the apparatus comprising:
a sensor configured to capture an input image;
a memory configured to store a neural network, including one or more convolution blocks, for a determination of whether biometric information of a user in the input image is spoofed; and
a processor configured:
generate a feature map including a plurality of channels for an input feature map for the input image using one or more convolution layers of a convolution block of the one or more convolution blocks; and
generate output data, for the determination of whether the biometric information is spoofed, dependent on the generated feature map and a result of a skip connection structure of the convolution block,
wherein the convolution block includes an attention mechanism, and
wherein, when a total number of input channels of the convolution block and a total number of output channels of the convolution block are different the total number of input channels of the convolution block are matched with the total number of output channels of the convolution block using a skip connection structure of the convolution block,
wherein the processor is further configured to implement the attention mechanism, where the attention mechanisms includes an assignment of respective weights for channels of the feature map using an attention layer included in the convolution block, and
wherein, for the generation of the output data, the processor is configured to generate the output data for the determination of whether the biometric information is spoofed dependent on a result of the assigning of the respective weights for the channels of the feature map and dependent on a result of the skip connection structure that includes the added zero-padding channel.

34. The apparatus of claim 33, wherein the processor is further configured to:
perform the determination of whether the biometric information is spoofed based on the generated output data; and
perform user authentication of the input image, where a result of the performed user authentication is dependent on a result of the performed determination.

35. The apparatus of claim 33, wherein the processor is configured to, in response to a performed determination that the total number of input channels and the total number of output channels are different, add a zero-padding channel to the input feature map through concatenating the zero-padding channel corresponding to a determined insufficient number of channels in the input feature map of the corresponding convolution block to the input feature map using the skip connection structure.

36. The apparatus of claim 33, wherein the processor is configured to, when the total number of input channels and the total number of output channels are same, output the input feature map as an identity skip connection as the result of the skip connection structure of the convolution block.

37. The apparatus of claim 33, wherein the processor is configured to, in response to a non-channel size of an input feature map of the convolution block and a non-channel size of an output feature map of the convolution block being different, match the non-channel size of the input feature map and the non-channel size of the output feature map using a pooling layer included in the skip connection structure for generating the result of the skip connection structure of the convolution block.

38. The apparatus of claim 37, wherein the processor is configured to, in response to the non-channel size of the input feature map and the non-channel size of the output feature map being same, implement the skip connection structure without implementation of the pooling layer.

39. The apparatus of claim 33, wherein
the one or more convolution blocks include at least two convolution blocks that have different convolution parameters, and
the different convolution parameters comprise any one or any combination of different respective convolution layer channel multiplication sizes between the at least two convolution blocks, different respective convolution kernel sizes of at least one respective convolution layer between the at least two convolution blocks, and different respective total numbers of channels of respectively generated feature maps of the at least two convolution blocks.

40. The apparatus of claim 33, wherein, with respect to the generating of the feature map, the convolution block comprises:
a first convolution layer with a size of 1×1 configured to generate a first feature map dependent on the input feature map, the first feature map having a same size as a size of the input feature map and a different total number of channels from a total number of channels of the input feature map;
a second convolution layer with a size of k×k configured to generate a second feature map dependent on the first feature map, the second feature map having a same total number of channels as the total number of channels of the first feature map and a size obtained by changing the size of the first feature map, where k is a natural number greater than zero; and
a third convolution layer with a size of 1×1 configured to generate a third feature map dependent on the second feature map, the third feature map having a same size as the size of the second feature map and a same total number of channels, as or a different number total of channels from, the total number of channels of the second feature map.

41. The apparatus of claim 40, wherein the second convolution layer comprises one of a depth-wise separable convolution layer and a group-wise convolution layer.

42. The apparatus of claim 40, wherein the convolution block further comprises at least one of:

one or more normalization layers configured to respectively normalize the generated first feature map, the generated second feature map, and/or the generated third feature map; and
one or more nonlinear activation functions respectively provided the normalized first feature map, the normalized second feature map, and/or the normalized third feature map.

43. The apparatus of claim 42, wherein the second convolution layer is configured to generate the second feature map based on a result of a first nonlinear activation function of the one or more nonlinear activation functions that is provided the normalized first feature map, the third convolution layer is configured to generate the third feature map based on a result of a second nonlinear activation function of the one or more nonlinear activation functions that is provided the normalized second feature map, and/or the generation of the output data is based on a result of a third nonlinear activation function of the one or more nonlinear activation functions that is provided the normalized third feature map.

44. The apparatus of claim 33, wherein the processor is further configured to implement the attention mechanism, where the attention mechanism includes an assignment of respective weights for channels of a corresponding feature map, generated dependent on the one or more convolution layers, using an attention layer included in the convolution block,
wherein the assignment of the respective weights for the channels of the corresponding feature map comprises an assignment, according to determined importances of each channel of the corresponding feature map, of respective weights for each channel of the corresponding feature map using the attention layer.

45. The apparatus of claim 33, wherein the one or more convolution layers of the convolution block include at least three convolution layers,
the attention layer is disposed after a third convolution layer among the at least three convolution layers, and
for the assignment of the respective weights, the processor is configured to assign respective weights for each channel of a feature map resulting from the third convolution layer.

46. The apparatus of claim 33, wherein the one or more convolution layers of the convolution block include at least three convolution layers,
the attention layer is disposed between a second convolution layer and a third convolution layer among the at least three convolution layers, and
for the assignment of the respective weights, the processor is configured to assign respective weights for each channel of a feature map resulting from the second convolution layer and prior to the third convolution layer.

47. The apparatus of claim 33, wherein the attention layer comprises:
a global pooling layer configured to resize a corresponding feature map, generated by one of the one or more convolution layers, to a size of 1×1;
a first fully connected layer configured to convert the resized corresponding feature map into a single vector by smoothing the resized corresponding feature map;
a second fully connected layer configured to smooth an output of the first fully connected layer; and
a nonlinear activation function configured to change a form of an output of the second fully connected layer.

48. The apparatus of claim 46, wherein the nonlinear activation function comprises one of a hard sigmoid function, a softmax function, and a hyperbolic tangent (tanh) function.

49. The apparatus of claim 33, wherein the processor is configured to:
respectively input a plurality of images, including the input image, to a plurality of neural networks each configured to generate data for determining whether biometric information in a corresponding input image of the input plurality of images is spoofed, where each of the plurality of neural networks includes one or more corresponding convolution blocks with at least one of the plurality of neural networks being input the input image and includes the convolution block, and
determine whether a biometric information for any of the plurality of images is spoofed dependent on a plurality of each of on the generated data.

50. The apparatus of claim 49, wherein the determination of whether the biometric information for any of the plurality of images is spoofed includes an element-wise summation of each of the generated data.

51. The apparatus of claim 33, wherein the sensor comprises any one or any combination of an ultrasonic fingerprint sensor, an electrostatic fingerprint sensor, an optical fingerprint sensor, an iris sensor, a depth sensor, and an image sensor.

52. The apparatus of claim 33, wherein the biometric information comprises one of a fingerprint, an iris, and a face of the user.

53. The method of claim 4, wherein the other convolution block includes another attention mechanism.

\* \* \* \* \*